(12) United States Patent
Nebiker et al.

(10) Patent No.: US 7,054,423 B2
(45) Date of Patent: May 30, 2006

(54) MULTI-MEDIA COMMUNICATION DOWNLOADING

(76) Inventors: Robert M. Nebiker, 5948 Sand Wedge La. #903, Naples, FL (US) 34110; Robert F. Meyerson, 2180 Immokalee Rd., Suite 311, Naples, FL (US) 34110

(*) Notice: Subject to any disclaimer, the term of this patent is extended or adjusted under 35 U.S.C. 154(b) by 238 days.

(21) Appl. No.: 10/154,124

(22) Filed: May 23, 2002

(65) Prior Publication Data

US 2003/0059022 A1   Mar. 27, 2003

Related U.S. Application Data

(63) Continuation-in-part of application No. 10/000,543, filed on Oct. 23, 2001, and a continuation-in-part of application No. 09/961,532, filed on Sep. 24, 2001.

(51) Int. Cl.
*H04M 3/42* (2006.01)
*H04M 1/64* (2006.01)
*H04M 11/00* (2006.01)

(52) U.S. Cl. ............................. 379/201.01; 379/88.17; 379/93.24

(58) Field of Classification Search ........... 379/201.01, 379/219, 355.01, 428.04, 220.01, 88.17, 379/88.18, 93.24, 100.08; 455/412.1, 413, 455/556.1; 370/352

See application file for complete search history.

(56) References Cited

U.S. PATENT DOCUMENTS

| | | |
|---|---|---|
| 4,817,127 A | 3/1989 | Chamberlin et al. |
| 5,483,586 A | 1/1996 | Sussman |
| 5,550,907 A | 8/1996 | Carlsen |
| 5,655,015 A | 8/1997 | Walsh et al. |
| D389,146 S | 1/1998 | Tan |
| 5,742,905 A | 4/1998 | Pepe et al. |
| 5,799,068 A | 8/1998 | Kikinis et al. |
| 5,870,549 A | 2/1999 | Bobo, II |
| 5,878,395 A * | 3/1999 | Bennett ...................... 704/275 |
| 5,916,302 A | 6/1999 | Dunn et al. |

(Continued)

FOREIGN PATENT DOCUMENTS

EP       1011278      *  6/2000

OTHER PUBLICATIONS

Symbol Technologies, NetVision Data Phone Portable Voice and Data Terminal, 2002, http://www.symbol.com/products/wireless/nvdataphone.html.*

(Continued)

*Primary Examiner*—Benny Quoc Tieu
(74) *Attorney, Agent, or Firm*—Timothy P. O'Hagan

(57) ABSTRACT

A telecommunications system, for use with a packet-switched network and with a portable-communication-device docking station for receiving a portable communication device, includes a network interface configured to couple to the packet-switched network, a docking-station interface configured to couple to the portable-communication-device docking station, a real-time user interface including a microphone configured to receive sound signals and a speaker configured to provide sound signals corresponding to signals received via the packet-switched network, and a communication controller coupled to the real-time user interface, the docking-station interface, and the network interface, and configured to transfer streaming data between the network interface and the real-time user interface, to transfer non-streaming electronic messages from the network interface to the docking-station interface, and to send a download request to a remotely-located control unit via the packet-switched network in response to a download indication being received from the docking station interface, the download request being indicative of a request for an email download.

9 Claims, 21 Drawing Sheets

U.S. PATENT DOCUMENTS

| | | |
|---|---|---|
| 5,917,543 A | 6/1999 | Uehara |
| 5,979,757 A * | 11/1999 | Tracy et al. ............ 235/383 |
| 5,983,073 A | 11/1999 | Ditzik |
| 6,008,810 A * | 12/1999 | Bertram et al. ............ 715/809 |
| 6,188,677 B1 | 2/2001 | Oyama et al. |
| 6,240,168 B1 | 5/2001 | Stanford et al. |
| 6,330,244 B1 | 12/2001 | Swartz et al. |
| 6,330,321 B1 | 12/2001 | Detampel, Jr. et al. |
| 6,366,653 B1 | 4/2002 | Yeh et al. |
| 6,366,771 B1 | 4/2002 | Angle et al. |
| 6,389,005 B1 | 5/2002 | Cruickshank |
| 6,396,907 B1 | 5/2002 | Didcock |
| 6,404,772 B1 * | 6/2002 | Beach et al. ............ 370/443 |
| 6,405,049 B1 * | 6/2002 | Herrod et al. ............ 455/517 |
| 6,424,711 B1 | 7/2002 | Bayless et al. |
| 6,429,855 B1 | 8/2002 | Pabon et al. |
| 6,539,499 B1 | 3/2003 | Stedman et al. |
| 6,577,609 B1 | 6/2003 | Sharony |
| 6,587,034 B1 * | 7/2003 | Heiman et al. ............ 340/7.55 |
| 6,600,734 B1 | 7/2003 | Gernert et al. |
| 6,792,295 B1 | 9/2004 | Hanevich et al. |
| 2002/0054574 A1 * | 5/2002 | Beach et al. ............ 370/279 |
| 2002/0085535 A1 | 7/2002 | Williams |
| 2002/0086702 A1 | 7/2002 | Dimenstein et al. |
| 2002/0186823 A1 * | 12/2002 | Kikinis ............ 379/88.17 |
| 2003/0153353 A1 * | 8/2003 | Cupps et al. ............ 455/556 |
| 2003/0193946 A1 * | 10/2003 | Gernert et al. ............ 370/389 |
| 2004/0023656 A1 * | 2/2004 | Purdy et al. ............ 455/445 |
| 2004/0044667 A1 * | 3/2004 | Mahany et al. ............ 707/10 |

OTHER PUBLICATIONS

Symbol Technologies, Spectrum24 AP 3021 Ethernet Access Point, 2000, http://www.symbol.com/products/wireless/ap3021.html.*

Symbol Technologies, Press Release, Symbol Announces Wireless LAN Telephones System, Jan. 19, 1998.

* cited by examiner

245 →

Subscriber Identifier 237

| Subscriber ID | Subscriber Name | Subscriber Device ID Code | Current Network Address |
|---|---|---|---|
| 1234 | Bob | 001 | 192.168.abc.xyz |
| 1235 | Chris | 002 | 192.168.def.uvw |
| 1236 | Marvin | 003 | Open |
| . | . | . | . |
| . | . | . | . |
| . | . | . | . |

251 — Current Network Address Table

Address Book

| Group Name | Members | Contact Information |
|---|---|---|
| All Campus | Annette, Bill, Cindy, Dan, Elain ... | xxxxx |
| Building A | Annette, Bill, Homer, Irene | xxxxx |
| . | . | |
| . | . | |
| . | . | |
| Annette | Annette | Email, Telephone, etc. |

Figure 8b

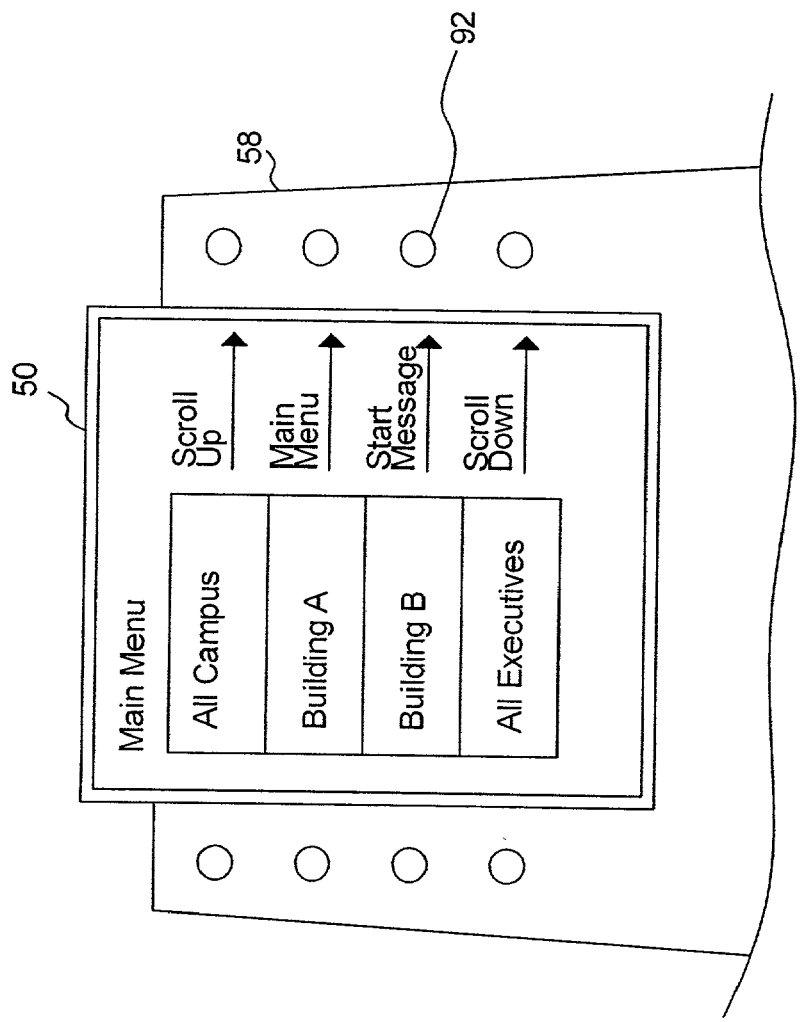

| Participant List | | |
|---|---|---|
| Status | Video | Participant |
| A | | Annette |
| I | | Bill |
| M | ✻ | Charlie |
| A | ∅ | Dave |
| A | | Edward |
| M | | Fred |
| M | | Gretchen |
| H | | Helga |
| H | | Irene |

Hold | Video

Figure 10f

| Select Call Participants | |
|---|---|
| 1 | All Campus |
| 2 | Building A |
| 3 | Building B |
| 4 | All Executives |
| 5 | All Sales |
| 6 | All Development |
| 7 | Project Alpha |
| 8 | Project Beta |
| 9 | Annette |
| 0 | Bill |

Finished

Figure 10e

MULTI-MEDIA COMMUNICATION DOWNLOADING

CROSS REFERENCE TO RELATED APPLICATIONS

This application is a continuation in part of U.S. patent application Ser. No. 10/000,543, filed on Oct. 23, 2001, entitled "Modular Multi-Media Communication Management System," that is a continuation in part of U.S. patent application Ser. No. 09/961,532, entitled "Teledata Space and Docking Station with Modular and Integrated Display," filed on Sep. 24, 2001, the contents of both such patent applications being incorporated herein.

TECHNICAL FIELD

The invention relates generally to managing multi-media communications, and more particularly to a system for downloading multi-media communications.

BACKGROUND OF THE INVENTION

Multi-media communications are becoming more prevalent and more important to people every day. Mobile phones, hand-held computers, personal digital assistants, etc. are more widespread than ever before. Functions provided by these devices include address books, email, voice mail, voice communications, calendars/appointment books, word processing, and instant messaging. These devices are emerging with new features, and combining more features of each other with each new product and generation of products. With the wide array of features available, people are becoming more accustomed to using such devices, and more dependent upon having them, and their functionalities, available whenever the people need them and wherever the people may go.

SUMMARY OF THE INVENTION

The multi-media communication management system comprises a controller that interfaces with a plurality of communication space stations, and their associated subscriber device(s), and with one or more communication medium service providers.

The controller translates multi-media communications received from a multi-media service provider into the protocols required for use by the communication space stations as well as any conventional telephone stations that may be coupled to the controller. The communication and control signaling between the controller and the communication space stations may be wireless in nature with the communication space stations each powered by an internal battery and/or connection to a local source of conventional line power.

The architecture of the communication space station is modular. Multiple functional elements can be interconnected with backbone communication circuitry to form an integrated communication platform. Modular docking interfaces may be used to couple the space station communication device to portable subscriber devices and to enable integrated and coordinated communication through multiple communication medium service providers. This coordinated and integrated system architecture enables the space station communication device to merge the functionality and internal data of the various portable subscriber devices into the space station communication device, to direct the functionality and data of the space station communication device to a selected one of the portable subscriber devices, and to provide the subscriber with a simple subscriber interface.

The multi-media communication services provided by the controller may include audio/video conference call mixing. The controller may establish an audio or an audio/video communication session with each of a plurality of communication space stations and telephones or video telephone systems coupled to the communication medium. A participant of an audio/video conference session may utilize a communication space station for controlling the session, establishing and terminating side conversations, putting certain participants on hold, and selecting amongst multiple video signals for viewing.

In general, in an aspect, the invention provides a telecommunications system for use with a packet-switched network and with a portable-communication-device docking station for receiving a portable communication device. The telecommunications system comprises a network interface configured to couple to the packet-switched network, a docking-station interface configured to couple to the portable-communication-device docking station, a real-time user interface including a microphone configured to receive sound signals and a speaker configured to provide sound signals corresponding to signals received via the packet-switched network, and a communication controller coupled to the real-time user interface, the docking-station interface, and the network interface, and configured to transfer streaming data between the network interface and the real-time user interface, to transfer non-streaming electronic messages from the network interface to the docking-station interface, and to send a download request to a remotely-located control unit via the packet-switched network in response to a download indication being received from the docking station interface, the download request being indicative of a request for an email download.

Implementations of the invention may include one or more of the following features. The communication controller is further configured to obtain access information from the portable communication device through the docking-station interface and to include the access information in the download request. The access information is for accessing an electronic message storage unit of the control unit. The access information includes at least one of a login name and a password. The access information includes a device ID of the portable communication device.

Implementations of the invention may also include one or more of the following features. The download indication indicates that the portable communication device has been received by the portable-communication-device docking station. The communication controller is configured to initiate the download request in response to receiving the download indication. The download indication indicates that a user of the portable communication device made a download selection using the portable communication device. The system further comprises a display and drivers, coupled to the speaker and the display, configured to play and display downloaded data conveyed through the docking-station interface. The communication controller is configured to receive the download as a download recipient and to send the download to the docking-station interface. The download request is indicative of associated information regarding statistics of the email including at least one of a length of a message, a time that the message was produced, and indicia of an entity producing the message. The communication controller is further configured to determine whether data received via the network interface are streaming data for real-time communications using the telecommunication system or are the requested email download.

In general, in another aspect, the invention provides a method of downloading an email from a control unit over a communications network to a portable communication device via a telecommunication system including a telephone, the control unit being disposed remotely from the telecommunication system. The method comprises coupling the portable communication device to the telecommunication system, producing a data download request requesting download data from the control unit, the download data being the email, sending the download request from the telecommunication system to the remotely-disposed control unit via the communications network, receiving inbound data from the control unit at the telecommunication system, and transferring the download data from the telecommunication system to the portable communication device.

Implementations of the invention may include one or more of the following features. The download request includes access information for accessing an electronic message storage unit of the control unit, the access information including at least one of a login name and a password. The access information includes a device ID of the portable communication device. The data download request is produced by the telecommunication system in response to the portable communication device being coupled to the telecommunication system. The method further comprises the control unit communicating with a server to obtain the download data. The data download request is produced by the portable communication device in response to the portable communication device being coupled to the telecommunication system. The data download request is produced by the portable communication device in response to a selection being made by a user of the portable communication device. The method further comprises at least one of playing an audio file of a downloaded email and displaying a downloaded email using the telecommunication system if the telecommunication system is coupled to the portable communication device. The download data include associated information regarding statistics of the data including at least one of a length of a message, a time that the message was produced, and indicia of an entity producing the message. The receiving includes storing the inbound data in the telecommunication system and the transferring includes sending the stored data to the portable communication device. The method further comprises determining whether the inbound data are streaming data for real-time communications using the telecommunication system or are the requested download data.

In general, in another aspect, the invention provides a telecommunications system comprising a housing providing a docking-station receptacle configured to receive a portable communication device, and a network port, a network interface configured to couple to a packet-switched network through the network port, a docking-station interface configured to couple to the portable-communication-device docking station when the portable communication device is received by the docking-station receptacle, a real-time user interface including a microphone configured to receive sound signals and a speaker configured to provide sound signals corresponding to signals received via the packet-switched network, and a communication controller coupled to the real-time user interface, the docking-station interface, and the network interface, and configured to transfer streaming data between the network interface and the real-time user interface, and to transfer non-streaming electronic messages from the network interface to the docking-station interface.

Implementations of the invention may include one or more of the following features. The communication controller is further configured to send a download request to a remotely-located control unit via the packet-switched network in response to a download indication being received from the docking station interface, the download request being indicative of a request for at least one of an email download and a voice mail download. The system further comprises a handset and wherein the real-time user interface disposed in the handset. The communication controller is configured to transfer associated information of the electronic messages, the associated information including information regarding statistics of the messages including at least one of a length of a message, a time that the message was produced, and indicia of an entity producing the message. The communication controller is further configured to determine whether data received via the network interface represent streaming data for real-time communications using the telecommunication system or represent at least one non-streaming electronic message. The communication controller is configured to initiate a real-time streaming-data session via the network interface with a remote device identified by indicia received via the docking-station interface. The system further comprises a power supply coupled to the docking-station interface to provide power to the portable communication device when the portable communication device is received by the docking-station receptacle.

For a better understanding of the present invention, together with other and further aspects thereof, reference is made to the following description, taken in conjunction with the accompanying drawings, and its scope will be pointed out in the appended clams.

BRIEF DESCRIPTION OF THE DRAWINGS

FIGS. 8a is a table diagram representing a current network location table in accordance with one embodiment of the present invention;

FIG. 8b is a table diagram representing a multicast group table in accordance with one embodiment of the present invention;

DESCRIPTION OF PREFERRED EMBODIMENTS

Figure 1:
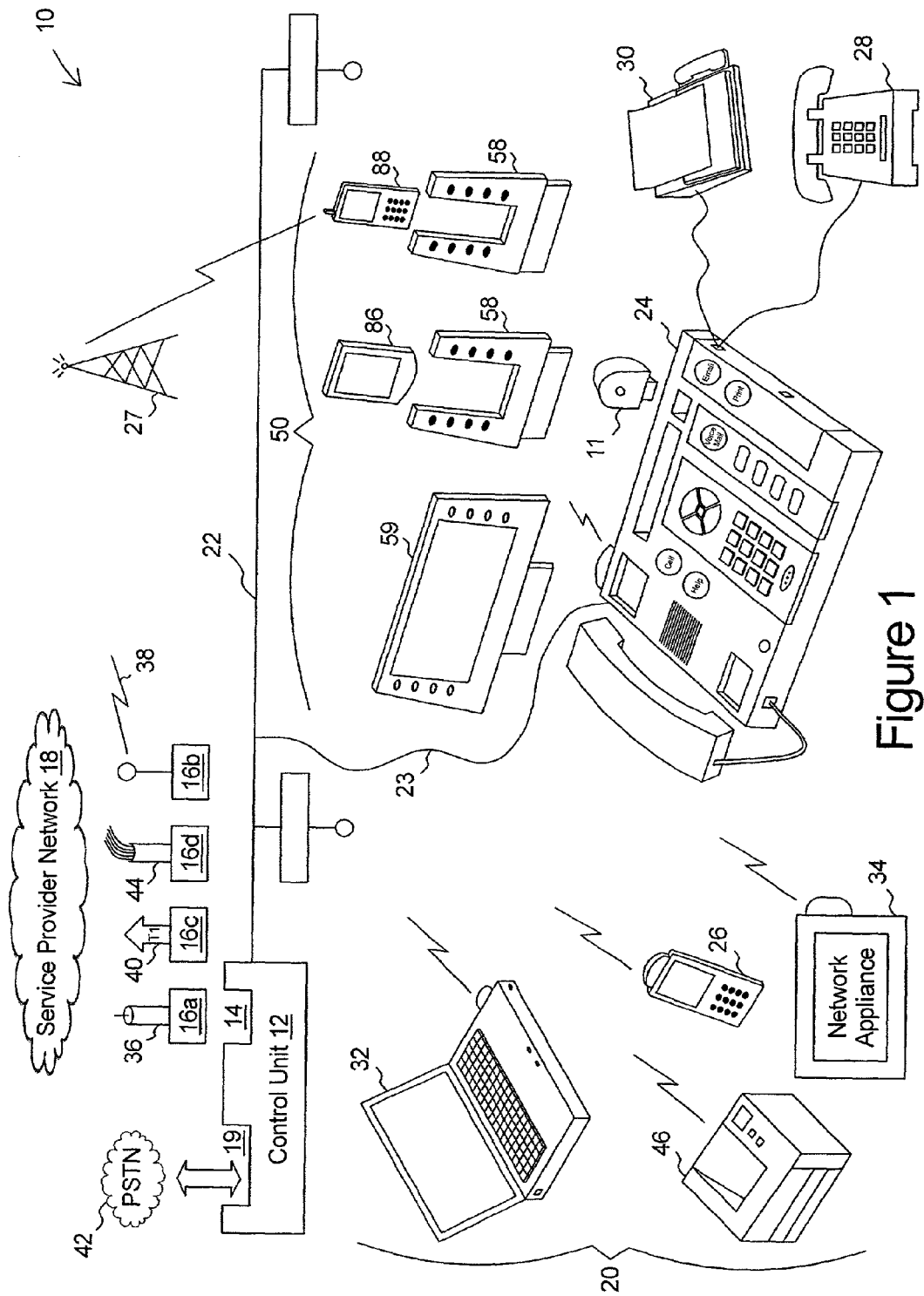
FIG. 1 is a block diagram view of a modular multi-media communication management system in accordance with one embodiment of the present invention.

The present invention is now described in detail with reference to the drawings. In the drawings, each element with a reference number is similar to other elements with the same reference number independent of any letter designation following the reference number.

It should also be appreciated that many of the elements discussed in this specification may be implemented in hardware circuit(s), a processor executing software code, or a combination of a hardware circuit and a processor executing code. As such, the term circuit or module as used throughout this specification is intended to encompass a hardware circuit (whether discrete elements or an integrated circuit block), a processor executing code, or a combination of a hardware circuit and a processor executing code, or other combinations of the above known to those skilled in the art.

Referring to FIG. 1, an exemplary architecture of the multi-media communication management system 10 of the present invention is shown. The multi-media communication management system 10 includes a control unit 12 that is coupled with a plurality of local communication devices 20 over a wireless local area network 22 (or by a wired network connection 23 to the backbone wired network of the wireless local area network 22). The local communication devices 20 may include: subscriber stations 24 (communication space stations 24), wireless dialog handsets 26, traditional telephone handsets 28, traditional fax machines 30 (both coupled through communication space station 24), traditional computer systems 32, network printers 46, and various network appliances 34.

The control unit 12 includes a circuit switched provider bay 19 which operatively couples the control unit 12 to one or more subscriber loops of the public switched telephone network (PSTN) 42 and includes a multi-media communication service provider bay 14 which operatively couples the control unit 12 to a multi media service provider's network 18 through one of a plurality of communication medium modules 16a–16d.

In the exemplary embodiment, the service provider's multi-media communication network 18 may utilize the Internet Protocol Suite for communication at the IP level, but may be proprietary at the data link and physical layers. As such, the control unit 12 includes the IP stacks applicable for communication between applications over the network 18 and each module 16a–16d includes the applicable data link and physical layer circuits for communication of IP frames over the physical medium of the network 18.

Some illustrative examples of communication modules include: communication module 16a which may be a cable modem module for communicating over coaxial cable 36 with a multi-media communication service provider such as a local cable company, communication module 16b which may be a wide area network radio for communication over a wireless spectrum channel 38 with a wide area wireless multi-media communication service provider such as an analog or digital cellular/PCS telephone service provider, communication module 16c which may be a customer service unit (CSU) for communication over a T1 line 40 with a multi-media communication provider such as a local telephone service provider, and communication module 16d which may be an optical modem for communication over a fiber channel 44 with a fiber optic multi-media communication service provider.

In operation, the control unit 12 integrates and manages multi-media communication between two or more local communication devices 20 and between each local communication device 20 and a remote communication system(s) (not shown) coupled to either the service provider's multi-media communication network 18 or the PSTN 42.

Figure 2:
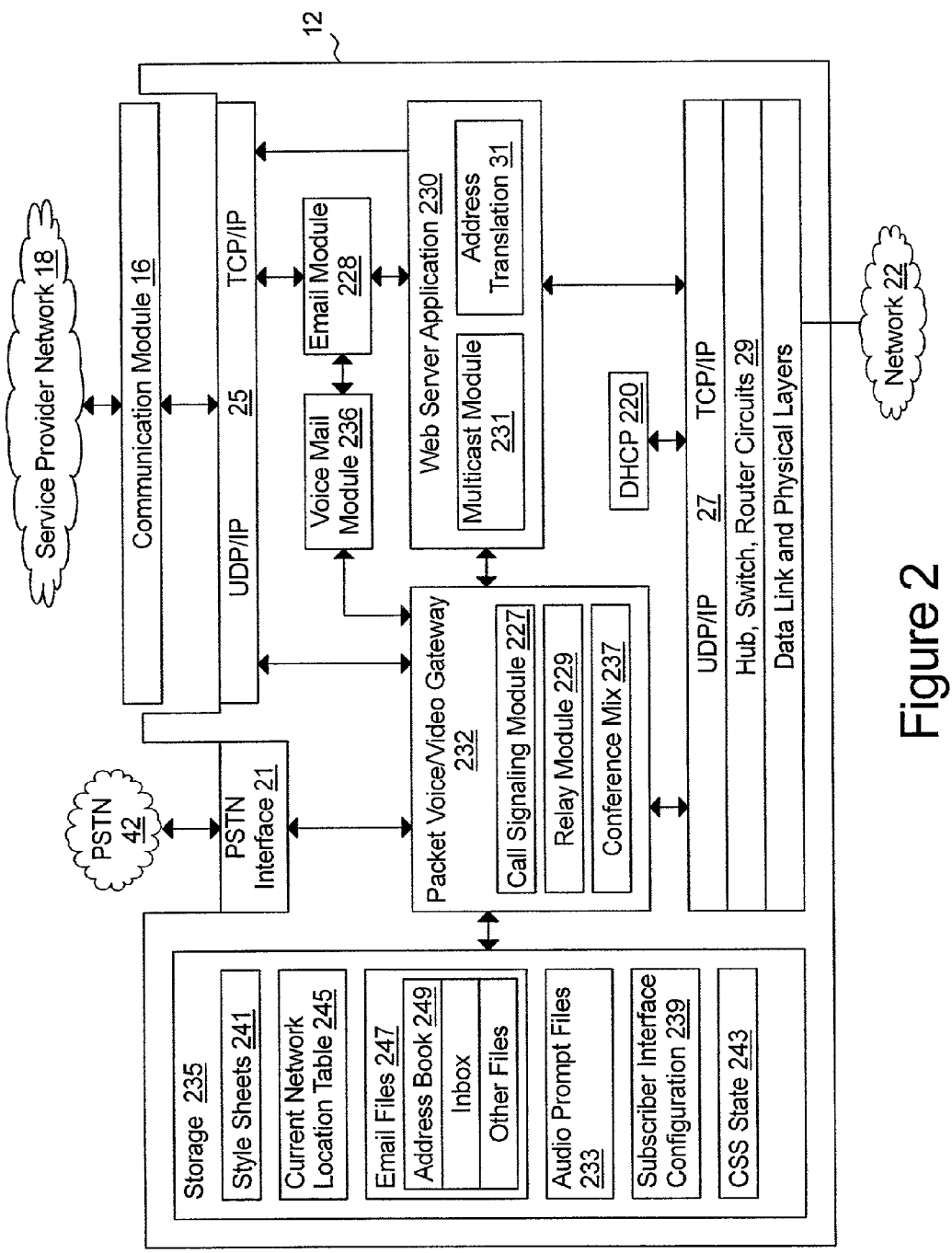
FIG. 2 is a block diagram of a multi-media communication management system controller in accordance with one embodiment of the present invention.

FIG. 2 shows a block diagram of an exemplary control unit 12 is shown. The control unit 12 includes applicable modules for managing the local area network 22 as an IP network. Such modules may include an applicable combination of hubs, routers, and switches 29 for managing communications over the network 22 as well as an address server 220 (e.g. DHCP server) for assigning local IP addresses to each local communication device 20.

The control unit 12 may also include a packet audio/video gateway 232, a voice mail module 236, an email module 228, and a web server application 230. The packet audio/video gateway 232 provides a subscriber's real time full duplex audio communication and audio/video communication services. The services may include routing and maintaining a subscriber's outgoing calls and incoming calls. A subscriber's outgoing calls may comprise audio calls, audio/visual calls, and multiparty conference calls (either audio or audio/visual) that are originated by a communication space station 24 that is associated with the subscriber. The destination(s) may be remote packet audio/video devices coupled to the network 18, remote telephones coupled to the PSTN 42, or other subscribers served by the multi-media communication management system 10. A subscriber's incoming calls may comprise calls (either audio or audio/visual) that are originated by a remote telephone device coupled to the PSTN 42, remote packet audio/visual devices coupled to the network 18, communication space stations 24, or the audio/visual conference module 229, and identify the subscriber as the destination subscriber.

The packet audio/video gateway 232 communicates over the network 22 and the network 18 utilizing IP protocols. However, audio communication over the PSTN 42 utilizes analog or PSTN digital audio signals. As such, the control unit 12 includes a PSTN interface 21 that includes circuits for translating between PSTN call signaling (and analog or PSTN digital audio communication) and digital call signaling messages (and digital audio communication formats and protocols) for use by the packet audio/video gateway 232. Therefore, for the sake of simplicity, the discussion of the packet audio/video gateway 232 herein will refer to PSTN interface 21 as an originating or destination device with which an audio call may be established and maintained. However, it should be appreciated that the PSTN interface 21 is not the ultimate origination or destination but is operating to interface the packet audio/video gateway 232 to a telephone system on the PSTN 42 with which it could not communicate directly.

The packet audio/video gateway 232 includes a call signaling module 227. The call signaling module 227 includes circuits for receiving call signaling messages from an originating device, identifying a destination device, providing call signaling messages to the destination device, and, if responded to by the destination device, negotiating compression algorithms and establishing channel usage for the relay of real time audio or audio/visual communications. In the exemplary embodiment, call signaling utilizes defined protocols such as the H.323 protocols promulgated by the International Telephony Union (ITU) or the Session Initiation Protocols (SIP) promulgated by the Internet Engineering Task Force (IETF).

Figure 11A:
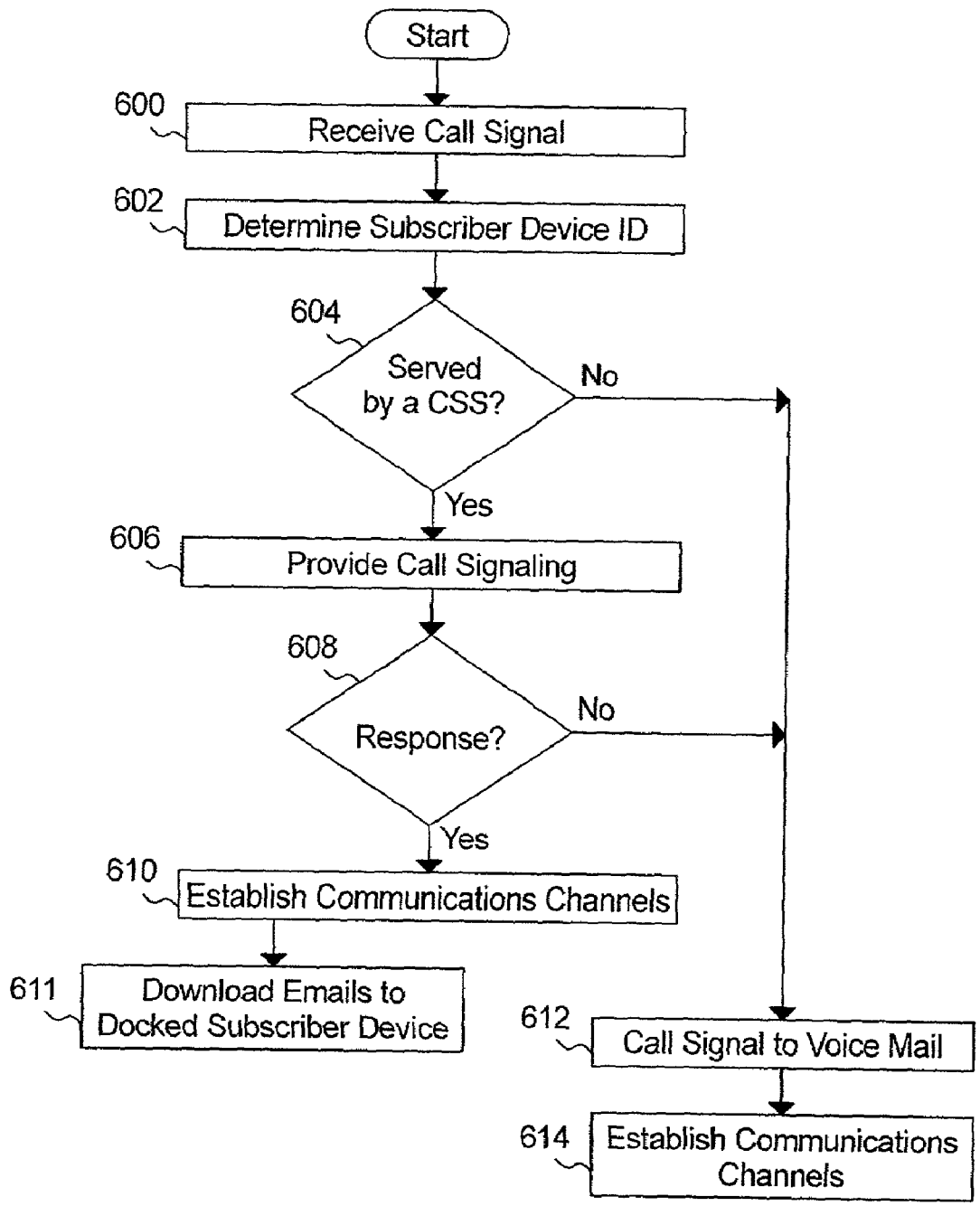
FIGS. 11a through 11c each show a flow chart representing exemplary operation of packet audio/video gateway in accordance with one embodiment of the present invention.
Figure 11C:
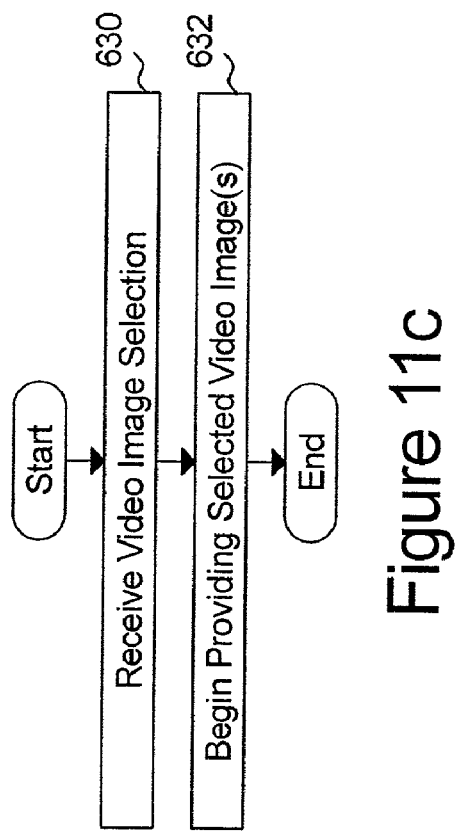
Figure 11B:
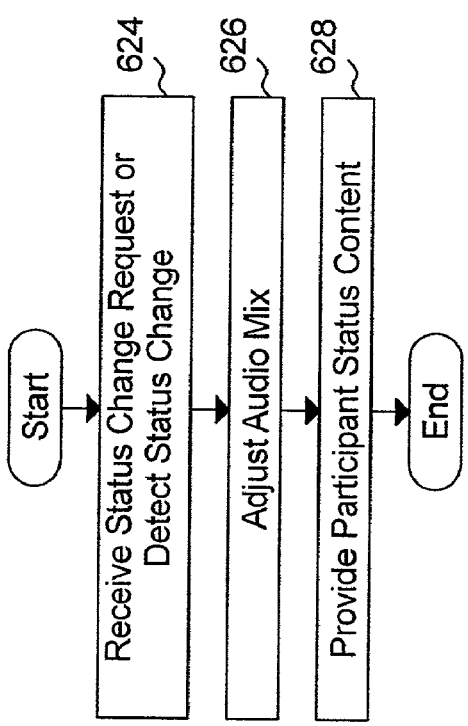

For inbound calls, the call signaling message provided by the originating device may identify a subscriber served by the multimedia communication management system 10. The call signaling module attempts to identify the communication space station 24 that is then serving the subscriber device 50 (FIG. 1) that is assigned to the identified subscriber. Referring to FIG. 11a in conjunction with the current network location table 245 of FIG. 8a, the process of identifying a destination device is shown.

Step 600 represents receipt of the call signaling message identifying the subscriber. In the exemplary embodiment, each subscriber will be assigned a four digit subscriber identifier number that corresponds to the last four digits of a PSTN direct dial number that routes to the PSTN interface 21 when dialed on the PSTN 42. As such, the call signaling message, whether provided by an originating device coupled to network 18, an originating device coupled to network 22, or the PSTN interface 24, may include the subscriber identifier number to identify the destination subscriber.

At step 602, the call signaling module 227 identifies a subscriber device 50 (FIG. 1) that is associated with the identified subscriber utilizing the network location table 245. To associate each subscriber with his or her subscriber device 50, the network location table 245 includes a record for each subscriber. Within such record is a field that identifies the subscriber, identifies the four digit subscriber identifier associated with the subscriber, and identifies a subscriber device ID code that is unique to the subscriber device 50 that is assigned to the subscriber.

At step 604 the call signaling module 227 identifies whether the subscriber's subscriber device 50 is served by a communication space station 24. The network location table 245 further includes a field that may comprise the network address of the communication space station 24 that is then currently serving the subscriber device 50 assigned to the subscriber. The address within this field will be updated when the subscriber moves his or her subscriber device 50 from one communication space station 24 to another using circuits and methods discussed herein. If the subscriber device is not currently served by any communication space station 24, then the field will indicate such as represented by the term "open".

If at step 604, the call signaling module 227 determines that the subscriber device 50 assigned to the subscriber is not currently served by any communication space station 24, the voice mail module 236 becomes the default destination device to which call signaling is provided at step 612. However, if the subscriber device is served by a communication space station 24, such communication space station 24 becomes the destination device to which call signaling is provided at step 606.

Step 608 represents the call signaling module 227 determining whether the communication space station 24 is responding to the call signaling. In certain events such as when the subscriber is already engaged in a telephone call or if the subscriber does not answer the inbound call, the communication space station 24 will not respond to the call signaling. In which case, the voice mail module 236 will again become the default destination device to which call signaling is provided at step 612.

If the call signaling is responded to by the communication space station 24, the call signaling module 227 will negotiate compression algorithms and establish communication channels, at step 610, with both the communication space station 24 and with the originating device to relay audio or audio/visual real time communications for the duration of the call.

If call signaling is provided to the voice mail module 236 at step 612, the call signaling module 227 will negotiate compression algorithms and establish communication channels, at step 614, only to the originating device to relay audio real time communications between the voice mail module 236 and the originating device until the originating device is disconnected from the voice mail module 236.

Returning to FIG. 2, for outbound calls, the call signaling module 227 may be provided with a number that represents the intended destination. The number may be a 10 digit number routable on the PSTN 42, a number identifying a person or station coupled to the network 18, or a subscriber ID representing a subscriber to the system 10. The call signaling module 227 may identify the destination device first by determining whether the number represents a person or destination coupled to the network 18, the PSTN routable telephone number, or a subscriber. The call signaling module 227 may refer to a directory within storage 235 that maps possible numbers to one of the three networks 18, 22, 42. It should be appreciated that a PSTN routable telephone number may also represent a person or station coupled to the network 18. As such, the directory within storage 235 may include a priority such that the call signaling module 227 will attempt to establish call signaling utilizing network 18 as a first priority and the PSTN 42 as a second priority.

If the destination device is coupled to the network 18, the number may be permanently assigned to a person or a station, however, the IP network address utilized by the person or station may change periodically. As such, the call signaling module 227 may query a remote directory server to determine the network address of the destination device or the network address of a proxy for the remote device. Call signaling is then provided to the destination device or the proxy. If the call signaling is responded to by the proxy or the remote device, the call signaling module 227 will negotiate compression algorithms and establish communication channels with both the originating communication space station 24 and with the proxy or remote device for the relay of audio or audio/visual real time communications for the duration of the call.

If the destination device is coupled to the PSTN 42, the destination device is the PSTN interface 21 and call signaling is provided to the PSTN interface 21. Again, if the call signaling is responded to by the PSTN interface 21 (indicating that the call has been established on the PSTN 42) the call signaling module 227 will negotiate compression algorithms and establish communication channels with the originating communication space station 24 for the relay of real time audio communications between the communication space station 24 and the PSTN interface 21 for the duration of the call.

If the destination device is a subscriber to the system 10, steps discussed above with respect to FIG. 11a are applicable.

For both inbound and outbound calls, the relay of real time audio or audio/video communications is provided by a relay module 229 within the packet audio/video gateway 232. The relay module 229 relays sequences of real-time transport protocol (RTP) frames that include compressed audio data and compressed video communications over the channels established by the call signaling module 227.

The relay module 229 also relays real time audio/video communications for conference calls between each of the call participants and a conference mix module 237. The conference mix module 237 includes audio mixing circuits for receiving multiple audio streams and generating one or more conference mix signals. The conference mix module 237 provides the conference mix signals back to the relay module 229 for relay back to the conference session participants.

The voice mail module 236 includes circuits for responding to the call signaling provided by the call signaling module 227, providing a sequence of RTP frames representing applicable audio prompts from compressed audio prompt files 233 to the relay module 229, receiving RTP frames from the relay module 229 representing the voice of the remote caller leaving a message for the subscriber, compressing the message into a digital audio file, and sending the digital audio file to the email module 228 for storage in the email files 247 for later retrieval by the subscriber.

The email module 228 maintains an email account associated with each subscriber. The email module 228 includes client circuits for interfacing with a remote email server. The email module 228 logs onto an account associated with each subscriber, obtains new email messages associated with the subscriber, and sends email messages drafted by the subscriber to the remote server. The email module 228 also maintains email files 247 in the storage 235 that may include an address book and an inbox for each subscriber.

The web server application 230 provides additional multi media communication services provided to each subscriber. Examples of the multi media communication services provided to each subscriber by the web server application 230 include: a) delivery of email and voice mail messages (as emailed audio files) to the communication space station 24 at which the subscriber's subscriber device 50 is then currently coupled; b) updating of the network location table 245 to assure proper routing of incoming audio and audio/video calls; c) proxy communication over network 18; d) delivery of multicast messages directed to a subscriber of the particular communication space station 24 at which his or her subscriber device is then currently coupled; and e) providing subscriber control of audio and audio/video conference calls through the packet voice gateway 232.

The web server application 230 includes a multicast module 231 and an address translation module 31. The multicast module 231 provides IP multicast services to enable the web server application 230 to deliver select communications to multiple communication space stations 24 simultaneously utilizing IP multicast protocols and without using excessive bandwidth on network 22. The address translation module 31 provides address and port translation services to enable the web server 230 to provide each communication space station 24 with access to servers coupled to the network 18 as an IP layer proxy and without using higher layer resources of the control unit 12.

In the exemplary embodiment, non streaming media communication between the web server application 230 and each communication space station 24 utilizes tagged data messages over a TCP/IP session between the web server application 230 and a system client application 115 (FIG. 4) within the communication space station 24. Each message transferred between the web server application 230 and the communication space station 24 comprises a data element and a tag identifying the significance of the data element. For example: a) if the data element comprises the text of an email message, the tag would identify the data element as the text of an e-mail message; b) if the data element comprises an executable script that would provide for the communication space station 24 to perform a certain function, the tag would identify the data element as executable script and may identify the significance of the script; and c) if the data element comprises display layout control information (e.g. a style sheet) defining how another date element (such as the text of the email) should be displayed on a display screen, the tag would identify the data element as a style sheet.

Streaming media communications between the web server application 230 (such as multicast streaming media messages provided by the IP multicast module 231) and the client application 115 utilize a sequence of RTP frames that include compressed media data and are sent utilizing UDP/IP channels.

To provide communication services to each subscriber, the web server application 230 processes certain scripts in response to events generated by a communication space station 24 and the packet audio/video gateway 232. In processing the scripts, the web server application 230 manages subscriber communication data stored in the storage 235 and provides operating instructions to communication space station client 24 and the email module 228.

The flow charts of FIGS. 9a through 9g (which will be discussed in more detail herein) represent processing scripts that in aggregate provide for a subscriber to navigate through a layered menu to select applicable services form the control unit 12. The web server application 230 maintains state information for each communication space station 24 such that each communication space station 24 may navigate through the layered menu independently of other communication space station units 24.

Communication Space Station

Figure 3:
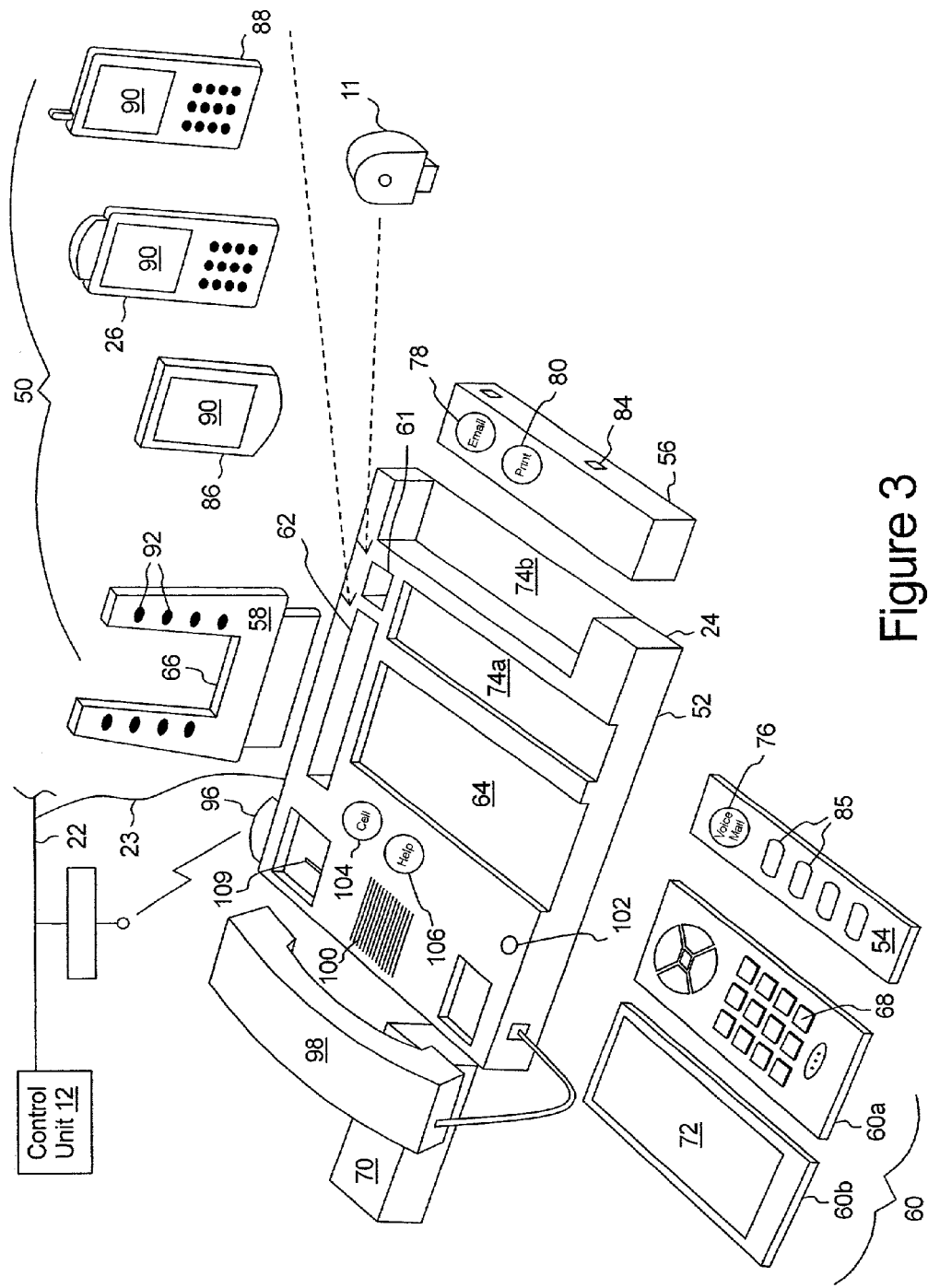
FIG. 3 is a perspective exploded view of a modular communication space station in accordance with one embodiment of the present invention.

Referring to FIG. 3, a perspective view of an exemplary communication space station 24 is shown. The communication space station 24 includes a platform unit 52 that operatively couples to the control unit 12 via either a wireless communication link between a platform unit network circuit 96 and the wireless network 22 or a direct network connection 23 between the platform unit 52 and the backbone network of the wireless network 22.

A plurality of functional modules 54, 56, 58, 60, and 11 may be coupled to the platform unit 52 to form an integrated multi-media communication platform. The platform unit 52 includes a subscriber interface docking platform 64 for coupling and optionally supporting one of a plurality of modular subscriber interface units 60 to the platform unit 52. The modular subscriber interface unit 60a may include a plurality of buttons 68 in an arrangement similar to a typical telephone key pad to provide for subscriber input in a manner similar to that of a traditional telephone handset. The modular subscriber interface 60b may include a touch panel graphic display 72 to provide for subscriber input through virtual buttons visible thereon.

The platform unit 52 further includes a first function specific docking platform 74a and a second function specific docking platform 74b, each of which couples to respective function specific modules 54 and 56. The first function specific docking platform 74a is a shallow platform for coupling to function specific modules that primarily comprise function specific buttons or other circuits that may be placed within a thin module. The second function specific docking platform 74b is a larger platform for coupling to function specific modules with more complex internal circuits requiring the additional size.

In the exemplary embodiment, the function specific module 54 may include subscriber interface buttons configured for enhancing voice communication through the communication space station 24 such as a voice message control 76 for single button access to voice message files and voice management controls 85 for single button control of enhanced voice management functions.

The function specific module 56 may include circuits configured for enhancing data communication through the communication space station 24 such as an email control 78 for single button access to subscriber email messages, a print control 80 for single button initiation of the printing of an email message, and a data networking port 84.

The platform unit 52 further includes a docking bay 62 into which a modular docking interface 58 may be secured and operatively coupled to the platform unit 52. The modular docking interface 58 supports one of a plurality of modular subscriber devices 50 within a subscriber device interface bay 66 and provides for operatively coupling the modular subscriber device 50 to the platform unit 52. Exemplary configurations for the modular subscriber device 50 include a subscriber data assistant 86, a subscriber wide area network communication device 88, and the wireless LAN voice handset 26, each of which is discussed in more detail herein.

While operatively coupled to the platform unit 52, the subscriber device 50 becomes an integral part of the subscriber interface of the communication space station 24. A liquid crystal graphic display 90 on the subscriber device 50 may function to display multi-media communication management information under control of the platform unit 52 and the control unit 12. Further, programmable subscriber controls 92 positioned adjacent to the subscriber device 50 may be configured to activate platform unit 52 and control unit 12 functions in accordance with the contents of the graphic display 90 adjacent to the controls 92.

The platform unit 52 also includes docking bay 61 into which a modular video camera 11 may be coupled to the communication space station 24. The modular video camera 11 provides a video image for use by the communication space station 24 when participating in a video conference call.

The platform unit 52 may further include one or more of the following elements: a) a handset 98 similar to a traditional telephone handset to provide a subscriber voice interface, b) a speaker 100 and a microphone 102 to provide a hands-free subscriber voice interface, c) a modular battery pack 70 (which fits within a battery pack bay that is not shown) for operating power when the communication space station 24 is uncoupled from a line voltage, d) cell button 104 for single button selection of certain functions such as a wide area network communication function, and e) help button 106 for single button selection of a help function.

Figure 4:
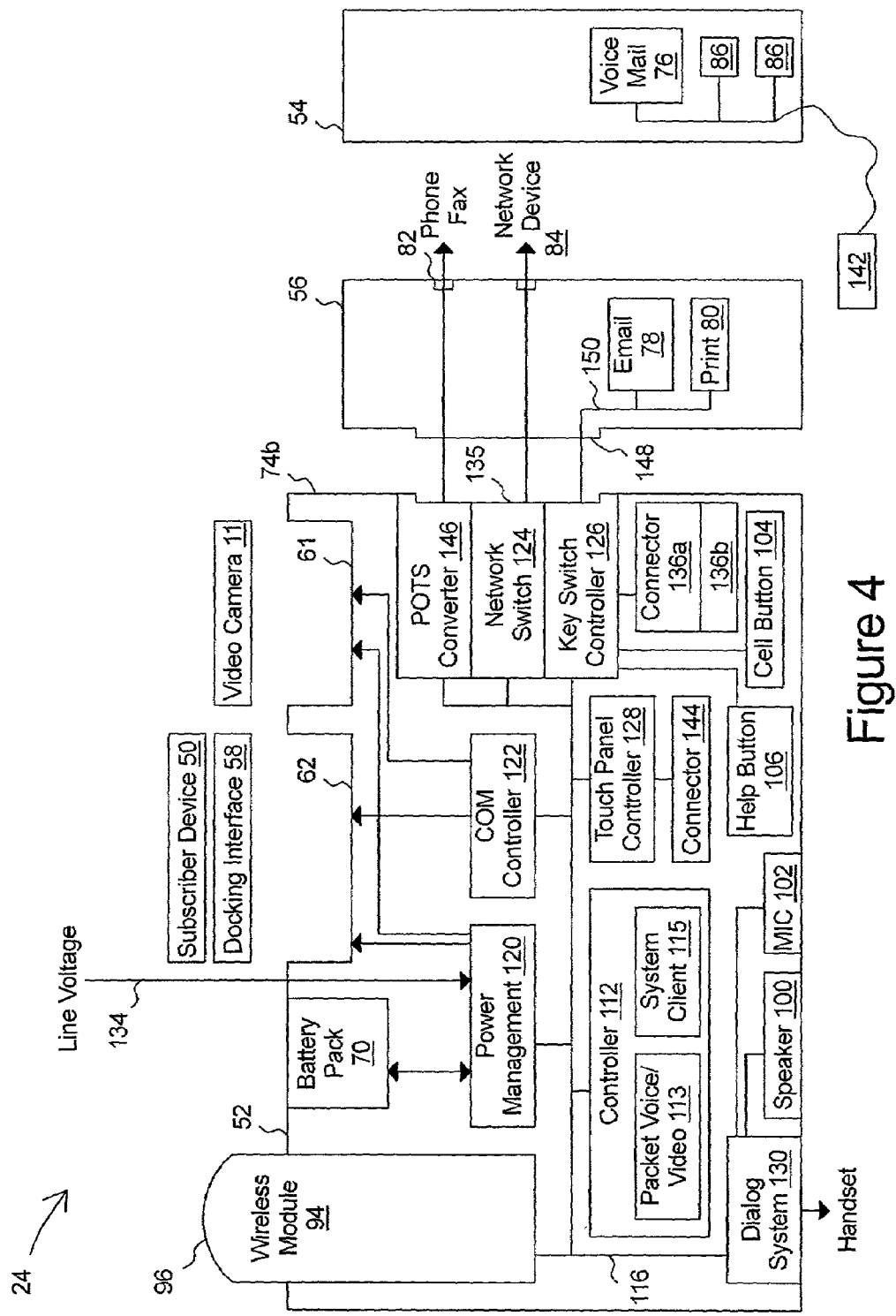
FIG. 4 is a block diagram of a communication space station in accordance with one embodiment of the present invention.

FIG. 4 shows a block diagram of the communication space station 24. The platform unit 52 includes an application controller 112 coupled to a local bus 116 that interconnects the controller 112 with a plurality of peripheral circuits that include a wireless module 94, a power management controller 120, a communication controller 122, a network switch controller 124, a key switch controller 126, a touch panel controller 128, a plain old telephone service (POTS) converter 146, and a voice communication system 130.

The wireless module 94 operatively couples the platform unit 52 with the control unit 12 over the wireless LAN 22 (both of FIG. 1). The controller 112 includes appropriate drivers for operation of the wireless module 94.

The power management controller 120 selectively receives input power from the battery pack 70 or external line voltage 134. The power management controller 120 includes appropriate circuits for converting the input power voltage to appropriate operating power required by each component of the communication space station 24. Additionally, the power management controller 120 includes appropriate circuits for managing charging of the battery pack 70 when the platform unit 52 is coupled to the line voltage 134 and generating appropriate power for operating and/or charging the modular docking interface 58 and the modular subscriber device 50 when coupled to the platform unit 52.

The communication controller 122 operatively couples the modular docking interface 58 and the modular subscriber device 50 to the controller 112 such that the platform 52 can exchange data with the modular subscriber device 50. In the exemplary embodiment, the communication controller 122 is a serial communication controller that enables the serial exchange of data with a compatible serial communication controller within the modular subscriber device 50 over a physical medium. Exemplary physical mediums include hardwired contacts, an infrared transmission, and RF transmission, however other physical mediums are envisioned and which medium is used is not critical to this invention. Data exchange between the communication space station 24 and the subscriber device 50 through the communication controller 122 includes email downloads from the control unit 12 to the subscriber device 50. In response to the subscriber device 50 docking in an appropriate docking interface 58, the communication controller 122 can relay email download requests to the control unit 12 through the wireless module 94 and can transfer downloaded emails (that can include attached voice mail audio files and that can include associated information (e.g., time and length of message, and identity of person/entity leaving the message such as caller ID information for a voice mail)) from the control unit 12 to the subscriber device 50. Further, the controller 122 can receive indicia from the device 50 of a remote device with which to establish, e.g., real-time communications. These indicia can be forwarded to the controller 112 to establish are real-time streaming-data communication session with the indicated remote device.

The communication control 122 also operatively couples the modular video camera 11 to the controller 112 such that the platform unit 52 may power the video camera 11 and receive the video image from the video camera 11.

The network switch controller 124 provides a network data port 84 which enables the controller 112 to communicate with another network computing circuit over a network interface. The network switch controller 124 is coupled to a bus port 135 within the function specific docking platform 74b for coupling to a mating port 148 on the function specific module 56.

The key switch (e.g. button) controller 126 is coupled to: 1) a connector 136a which in turn is coupled to a mating connector on the modular subscriber interface unit 60a (FIG. 3) for interconnecting the buttons 68 to the key switch controller 126; 2) a connector 136b which in turn is coupled to a mating connector 142 on the function specific module 54 for interconnecting the buttons 76 and 85 to the key switch controller 126; 3) the bus port 135 which in turn is coupled to a mating port 148 on the function specific module 56 for interconnecting the buttons 78 and 80 to the key switch controller 126; 4) the cell button 104; 5) and the help button 106. In the exemplary embodiment, the key switch controller 126 may drive row and column signals to the various buttons and, upon detecting a short between a row and a column (e.g. button activation) reports the button activation to the application controller 112 over the bus 116. Again, the application controller 112 includes appropriate drivers for operating the key switch controller 126.

The touch panel controller 128 is coupled to a connector 144 which in turn is coupled to a mating connector on the modular subscriber interface unit 60b (FIG. 3) for interconnecting the touch panel graphic display 72 to the touch panel controller 128. In the exemplary embodiment, the touch panel controller 128 may include a separate display control circuit compatible with the resolution and color depth of the touch panel graphic display 72 and a separate touch panel control circuit for detecting subscriber contact with the touch panel graphic display 72. The application controller 112 includes appropriate systems for driving the contents of the touch panel graphic display 72 through the touch panel controller 128.

The voice communication system 130 generates analog voice signals for driving the speaker 100 (or the speaker in the handset 98 of FIG. 3) and detects input from the microphone 102 (or the microphone in the handset 98) under the control of the application controller 112.

The POTS converter circuit 146 provides a standard POTS port signal (e.g. tip and ring) for operation of a traditional telephone or a traditional fax machine coupled to a POTS port 82 on the function specific module 56. In operation the POTS converter 146 circuit interfaces between the POTS signal and the application controller 112.

The controller 112 is configured to sort data packets or frames coming into the space station 24 and executes a packet audio/video communication client 113 and a client application 115. The controller 112 can determine whether an incoming packet is part of a real-time streaming communication or, e.g., an email being downloaded to the space station 24. This determination may be made by sorting data packets according to IP port number associated with the packet. The controller 112 can sort packets such that, e.g., an email can be downloaded while a real-time communication is taking place. Sorted packets can be sent to different modules, e.g., emails to be downloaded to a subscriber device 50 are sent to the communication controller 122 while real-time communication packets sent to the packet audio/video communication client 113.

The packet audio/video communication client 113 provides for setting up UDP/IP channels for RTP packet voice and RTP packet video communications with the packet audio/video gateway 232 (FIG. 2) within the control unit 12. And, during the course of an audio or audio/video session, the packet audio/video communication client 113 compresses video images from the video camera 11 into a sequence of RTP frames for sending to the gateway 232, compresses voice signals from the voice communication circuit 130 into sequences of RTP frames for sending to the gateway 232 and decompresses RTP frames of video images and audio signals received from the gateway 232 for driving the voice communication circuit 130 and for displaying a video image on a display. In the exemplary embodiment, the packet audio/video communication client 113 may be one of the commercially available clients utilizing established protocols such as the International Telephone Union (ITU) H.323 protocols, The Internet Engineering Task Force (IETF) Session Initiation Protocols, or other protocols useful for signaling and establishing a real time streaming media session with the packet audio/video gateway 232.

The client application 115 operates as a client to the web server application 230 (FIG. 3) within the control unit 12. The client application 115 provides for the controller 112 to: a) generate an image on the touch panel graphic display 72 or on the graphic display 90 on the subscriber device 50 in accordance with display content and a style sheet received from the control unit 12; b) output an audio stream file received from the control unit 12 through the dialog system 130; c) execute processing steps in accordance with instructions received from the control unit 12; d) provide messages indicating subscriber actions (such as subscriber activation of the cell button 104, the help button 106, a touch panel virtual button, or any other button on the communication space station 24) to the web server application 230; e) activate the packet audio/video client 113 to set up a real time audio/video session with the packet audio/video gateway 232 (FIG. 2); f) identify the modular configuration or subscriber interface configuration of the communication space station 24 and report the configuration to the control unit 12; and g) report the coupling of (and decoupling of) a subscriber device 50 and/or modules to the platform 52 of the communication space station 24 to the control unit 12.

Subscriber Data Assistant

Figure 5:
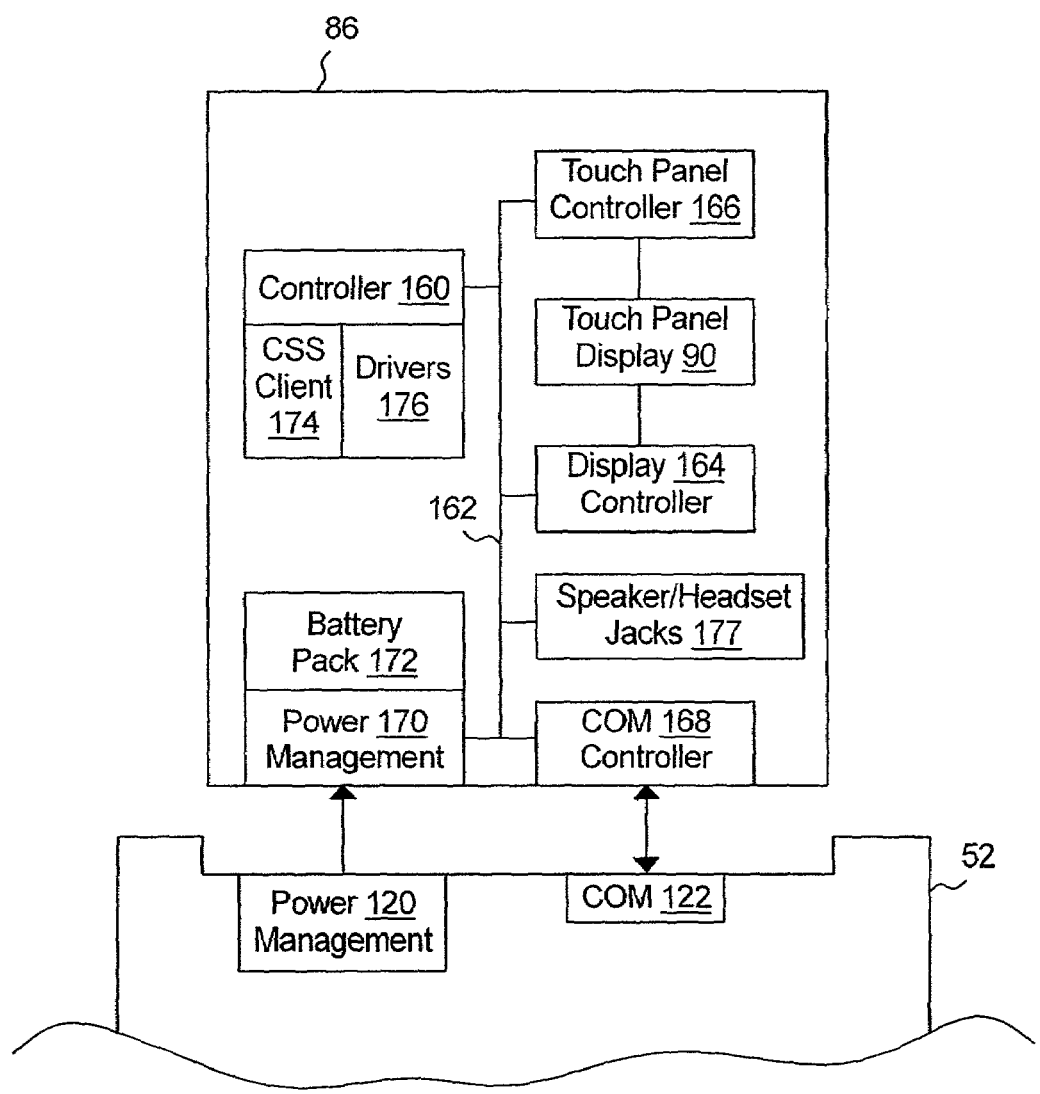
FIG. 5 is a block diagram of a subscriber data assistant in accordance with one embodiment of the present invention.

Turning to FIG. 5, exemplary structure of a subscriber data assistant 86 is shown. The subscriber data assistant 86 includes a controller 160 interconnected to a plurality of peripheral controllers by an internal bus 162. Because of the small size and the portability of the subscriber data assistant 86, the touch panel 90 provides the primary subscriber interface. The touch panel 90 is controlled by a display controller 164 and a touch panel controller 166. The display controller 164 drives the liquid crystal display of touch panel 90 using signals compatible with the resolution and color depth of the display 90. The touch panel controller 166 detects user activation of the touch panel 90. The controller 160 operates appropriate drivers 176 for controlling operation of the touch panel controller 166 and the display controller 164.

A communication controller 168 is also coupled to the bus 162 and operates under control of the application controller 160. In the exemplary embodiment, the communication controller 168 is a serial communication controller that is compatible with the communication controller 122 of the platform unit 52 (both of FIG. 4) such that data communication may occur between the platform unit 52 and the subscriber data assistant 86 when the subscriber data assistant 86 is operatively coupled to the platform unit 52. For example, emails can be downloaded from, or synchronized with emails stored by, the email module 228. Downloaded information can be stored, e.g., in FLASH memory of the subscriber data assistant 86. Stored messages, including associated information, can be displayed on the display 90 or played using a speaker discussed below. The communication controller 168 can initiate downloading and/or synchronizing of emails (e.g., using POP or IMAP) under control of the controller 160 in response to docking of the subscriber data assistant 86 in the docking interface 58, or in response to a download selection being made by the subscriber using the device 86. Alternatively, the communication controller 122 of the communication space station 24 can detect the docking or download selection and initiate the download request. In response to docking, the communication controller 168 conveys information, such as user name and password, for logging onto and accessing the subscriber's email accounts.

A power management circuit 170 selectively receives input power from a battery pack 172 or from the power management circuit 120 in the platform unit 52. The power management circuit 170 includes appropriate circuits for converting the input power voltage to appropriate operating power required by each component of the subscriber data assistant 86. Additionally, the power management circuit 170 includes appropriate circuits for managing charging of the battery pack 172 when the subscriber data assistant 86 is coupled to the platform unit 52.

The controller 160 also operates a communication space station client application 174 for displaying multi-media communication management information under control of the platform unit 52 when coupled to the platform unit 52. In the exemplary embodiment the communication space station client application 174 receives messages from the platform unit 52 in the form of tagged messages. After receipt of the tagged messages, the communication space station client application 174 builds a display document to display the communication management information represented by tagged content messages in accordance with a style sheet that is compatible with the size, resolution, and color depth of the touch panel display 90. The display document is then displayed on the touch panel display 90.

The controller 160 also operates an email/voice mail client 175 for receiving and displaying/playing emails and voice mails (as email attachments) downloaded from the control unit 12 through the communication space station 24. The email/voice mail client 175 is an application that can receive, organize, and display and/or play email messages, and could also send email messages. The messages, including associated information (e.g., time and length of message and identity of person/entity leaving the message), can be played/displayed using the communication space station 24 (using appropriate drivers for the display 72 and speaker 100) if the subscriber data assistant 86 is docked to the communication space station 24. Alternatively, the messages including their associated information can be displayed on the display 90 or played using a speaker/headset jack unit 177.

The subscriber data assistant 86 further includes the speaker/headset jack unit 177. A speaker of the unit 177 can receive power from the power management circuit 170 and audio signals from the communication controller 168. The speaker can play the signals from the controller 168 as audible sounds. A headset jack of the unit 177 allows a headset or earplug, or similar device, to be plugged into the jack for converting signals from the communication controller 168 into audible sounds. The unit 177 can thus be used by a subscriber to play audio emails, etc.

It should be appreciated that in additional to operating the drivers 176 and the communication space station client application 174, the controller 160 may optionally operate any of the software applications that are commercially available for personal data assistants (PDAs) which may include address book management, email management, calendar management, and games.

Subscriber Wide Area Network Communication Device

Figure 6:
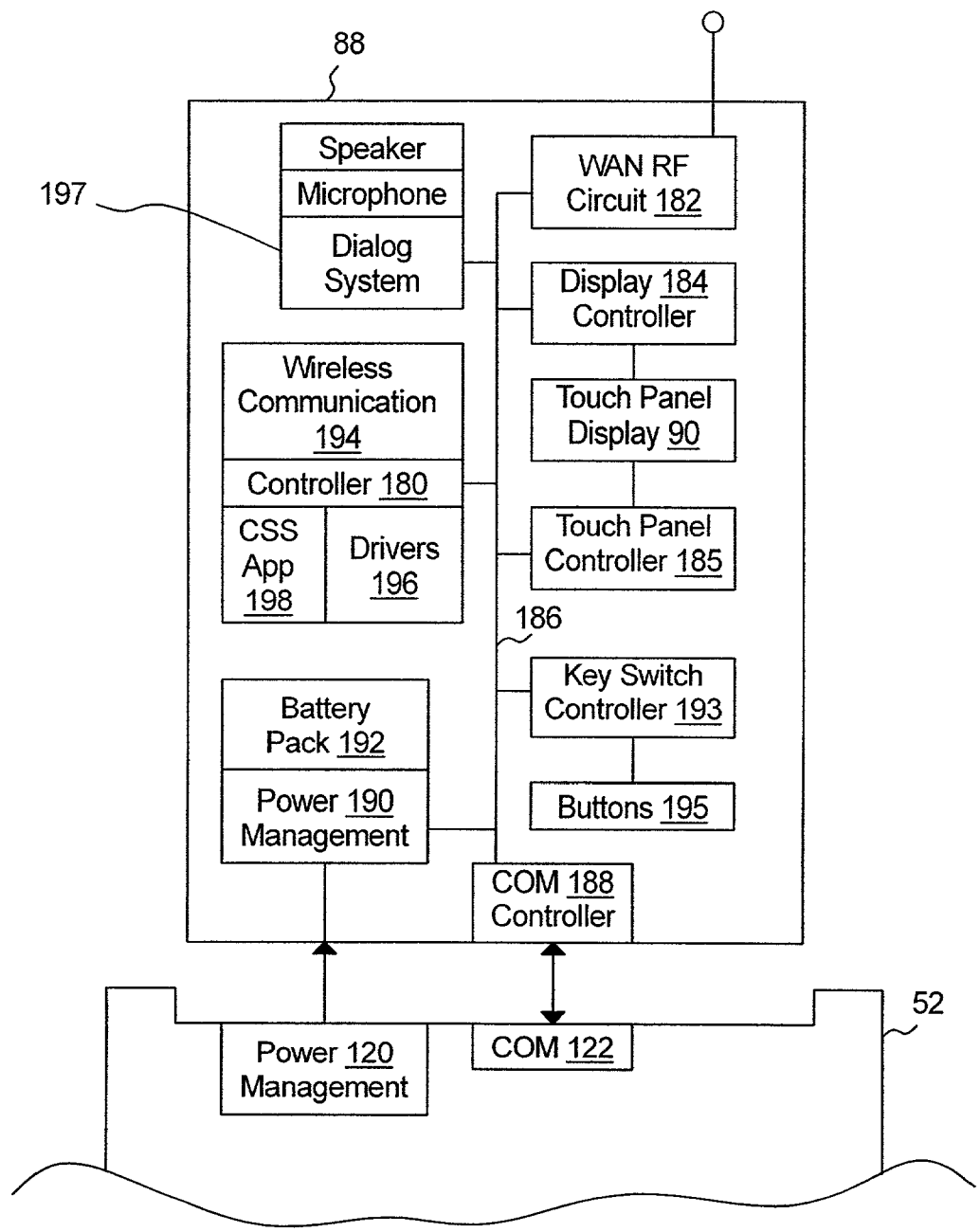
FIG. 6 is a block diagram of a wide area network communication device in accordance with one embodiment of the present invention.

Turning to FIG. 6, exemplary structure of a subscriber wide area network communication device 88 is shown. The wide area network communication device 88 includes a controller 180 operating a Communication Space Station application 174', the subscriber contact directory application 178, a wireless communication application 194, and applicable drivers 196 for a plurality of peripheral controllers.

The controller 180 is interconnected to the plurality of peripheral controllers by an internal bus 186. The peripheral controllers include a wide area network RF circuit 182, a voice system 197, a display controller 184, a touch panel controller 185, a key switch controller 193, a communication controller 188, and a power management system 190.

The wide area network RF circuit 182 may be a circuit for transmitting and receiving signals from a wide area network service provider's medium under control of the wireless communication application 194. Exemplary wide area network service provider mediums include an analog or digital cellular or PCS telephone RF system.

The key switch controller 193 is coupled to the control buttons 195. The key switch controller 193 drives row and column signals to the control buttons 195 and, upon detecting a short between a row and a column indicating button activation, reports the activation to the controller 180. The control buttons may be used by a subscriber for operating the wide area network communication device 88 when uncoupled form the platform unit 52.

The voice system 197 includes a speaker and a microphone. Under control of the wireless communication application 194, the voice system 197 may provide a subscriber voice interface for an audio session with a remote device over the wide area network service provider's medium. The voice system 197 includes a voice mail application for playing, via the speaker, voice mails (including associated information) received from the communication space station 24.

The display controller 184 drives the display 90 using signals compatible with the resolution and color depth of the display 90. The display 90 may optionally be a touch panel display 90 and the touch panel controller 185 detects user activation of the touch panel 90. The display controller 184 includes an email client for receiving and displaying/playing emails downloaded from the control unit 12 through the communication space station 24. This email client is an application that can send, receive, organize, and display and/or play email messages. The messages, including associated information, can be displayed on the display 90 or played using the speaker of the voice system 197.

The communication controller 188 may be a serial communication controller compatible with the communication controller 122 in the platform unit 52 such that data communication may occur between the platform unit 52 and the wide area network communication device 88 when the wide area network communication device 88 is operatively coupled to the platform unit 52. For example, emails (including voice mail attachments) can be downloaded from, or synchronized with emails stored by, the email module 228. Downloaded information can be stored, e.g., in FLASH memory of the subscriber wide area network communication device 88. Stored messages can be displayed on the display 90 and/or played by the speaker. Alternatively, the messages can be played/displayed using the communication space station 24 (using appropriate drivers for the display 72 and speaker 100) if the device 88 is docked to the communication space station 24. The communication controller 188 can initiate downloading and/or synchronizing of emails (e.g., using POP or IMAP) under control of the controller 180 in response to docking of the subscriber device 88 in the docking interface 58, or in response to a download selection being made by the subscriber using the device 88. Alternatively, the communication controller 122 of the communication space station 24 can detect the docking or download selection and initiate the download request. In response to docking or other (e.g., manual selection) email download initiation, the communication controller 188 conveys information, such as device ID, user name, and/or password, for logging onto the subscriber's email account. This information can also be provided before or after an email download is initiated.

The power management controller 190 operates with a battery pack 192, both of which may operate in a similar manner to the power management controller 170, and the battery pack 172 discussed with reference to FIG. 5.

Similar to the subscriber data assistant 86 (FIG. 5), when the wide area network communication device 88 is coupled to the platform unit 52, the Communication Space Station application 174' provides for displaying multi-media communication management information under control of the platform unit 52 and provides for multi-media communication directly between the platform unit 52 and the wide area network service provider medium.

In addition the Communication Space Station application 174' may receive messages from the platform unit 52 which may be multi-media communication messages for communication over the wide area network service provider medium. Each message includes a tag that identifies the contents of the message. After receipt of a tagged message, the Communication Space Station application 174' may identify whether the message is for communication with the wide area network service provider medium or whether it is multi-media communication management information for display.

When the message is for communication with the wide area network service provider medium, the Communication Space Station application 174' will reformat the message to a format compatible with wide area network service provider medium transmission standards and transmit the message using the wide area network RF circuit 182.

The wide area network communication device 88 may also receive signals from the wide area network service provider medium via the wide area network RF circuit 182. When received, the Communication Space Station application 174' reformats the messages into a plurality of tagged messages for communication to the platform unit 52 and sends the tagged messages to the platform unit 52 via the communication controller 188.

Figure 12:
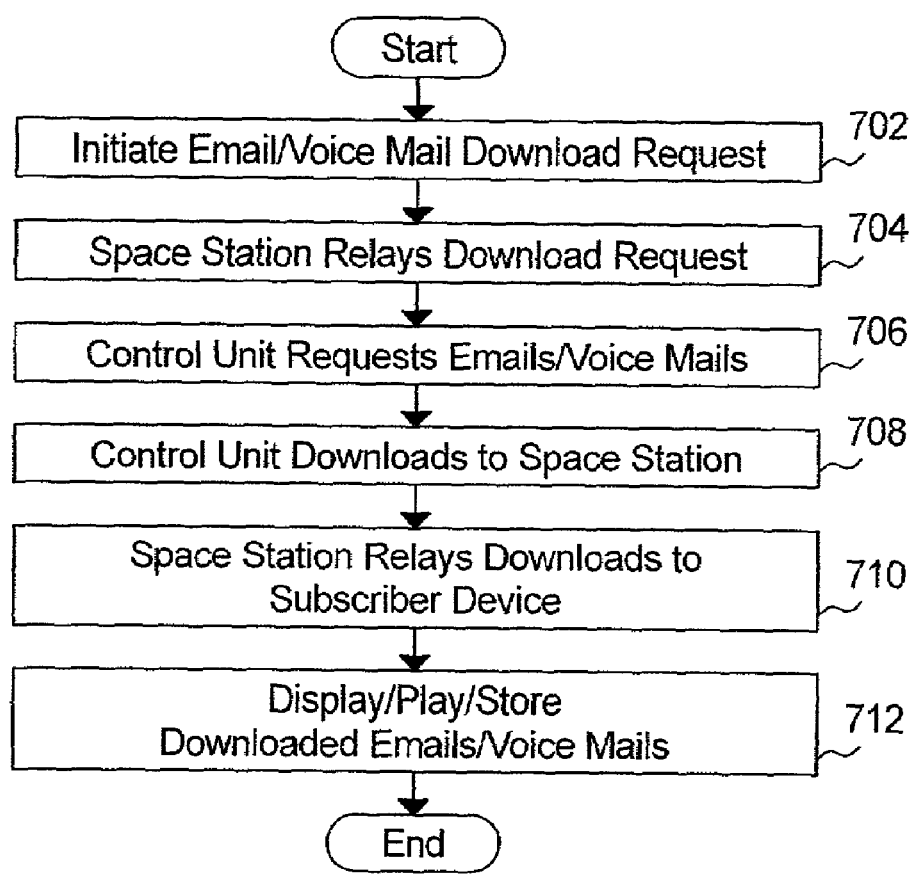
FIG. 12 is a block flow diagram of a process of requesting downloading of emails.

Email/Voice Mail Download Requesting Using the Subscriber Data Assistant and/or the Subscriber Wide Area Network Communication Device Referring to FIG. 12, a process 700, with further reference to FIGS. 1–6, a process 700 for requesting email downloads (that may include voice mail attachments) using the system 10 includes the stages shown. The process 700, however, is exemplary only and not limiting. The process 700 can be altered, e.g., by having stages added, removed, or rearranged.

At stage 702, an email mail download request is initiated. To initiate the request, a subscriber device 86, 88 is inserted into the appropriate docking interface 58 or a manual email request selection is made (e.g., using the subscriber device 50). In response to email request initiation, the communication controller 168, 188 sends information for logging on to the subscriber's email mail account. This information can be sent upon docking of the device 50 or at other times, e.g., in response to other email download initiations (e.g., manual selections), before such initiation, or after download request initiation. Further in response to the docking, or in response to a download selection being made by the subscriber via the device 86, 88, the communication controller 168, 188 of the device 86, 88 sends a download request to the communication space station 24 to which the docking interface 58 is connected. Alternatively, the communication controller 122 of the communication space station 24 can detect the docking or manual selection and initiate the download request.

At stage 704, the download request and log-in information are relayed by the communication space station 24 to the control unit 12. The download request and log-in information (e.g., subscriber device ID, user name, and/or password) are received by the communication controller 122 of the communication space station 24. The controller 122 transfers the request and log-in information through the wireless module 94 and through the network 22, to the control unit 12. If the controller 122 initiates the request, then at this stage the controller 122 sends the request, instead of transferring the request.

At stage 706, the control unit 12 receives the download request and log-in information, logs on to the subscriber's email account using the log-in information, and requests transfer of emails, including associated attachments and information (e.g., time and length of message and identity of person/entity leaving the message), from an appropriate server. Emails will be transferred from the appropriate servers in SMTP protocol to the control unit 12, for addition to or synchronization with the emails stored in the email files 247.

At stage 708, the emails, including associated information, are downloaded from the control unit 12 to the communication space station 24. Emails are downloaded using the SMTP protocol to the communication controller 122. A more detailed description of the operation of the control unit 12 for downloading emails is provided below with respect to FIG. 9d.

At stage 710, the downloaded emails, including associated information, are relayed to the subscriber device 86, 88. The downloads are relayed by the communication controller 122 of the communication space station 24 to the appropriate communication controller 168, 188 of the corresponding subscriber device 86, 88 that initiated the download request.

At stage 712, the downloaded email (including associated information) are displayed, played, and/or stored. Downloaded emails can be displayed by the displays 90 of the devices 86, 88. Voice mails, that are audio file emails, can be played through the speaker 177 of the device 86 or the speaker of the voice system 197 of the device 88. Downloaded emails can also be played/displayed by the communication space station 24 if the device 86, 88 is docked to the communication space station 24. The downloaded emails can be stored, e.g., in FLASH memory. The downloaded emails can be displayed/played upon arrival, or if stored, can be displayed/played later, including after the subscriber data assistant 86 or subscriber wide area network communication device 88 has been removed from the associated docking interface 58.

Wireless Voice Handsets

Figure 7:
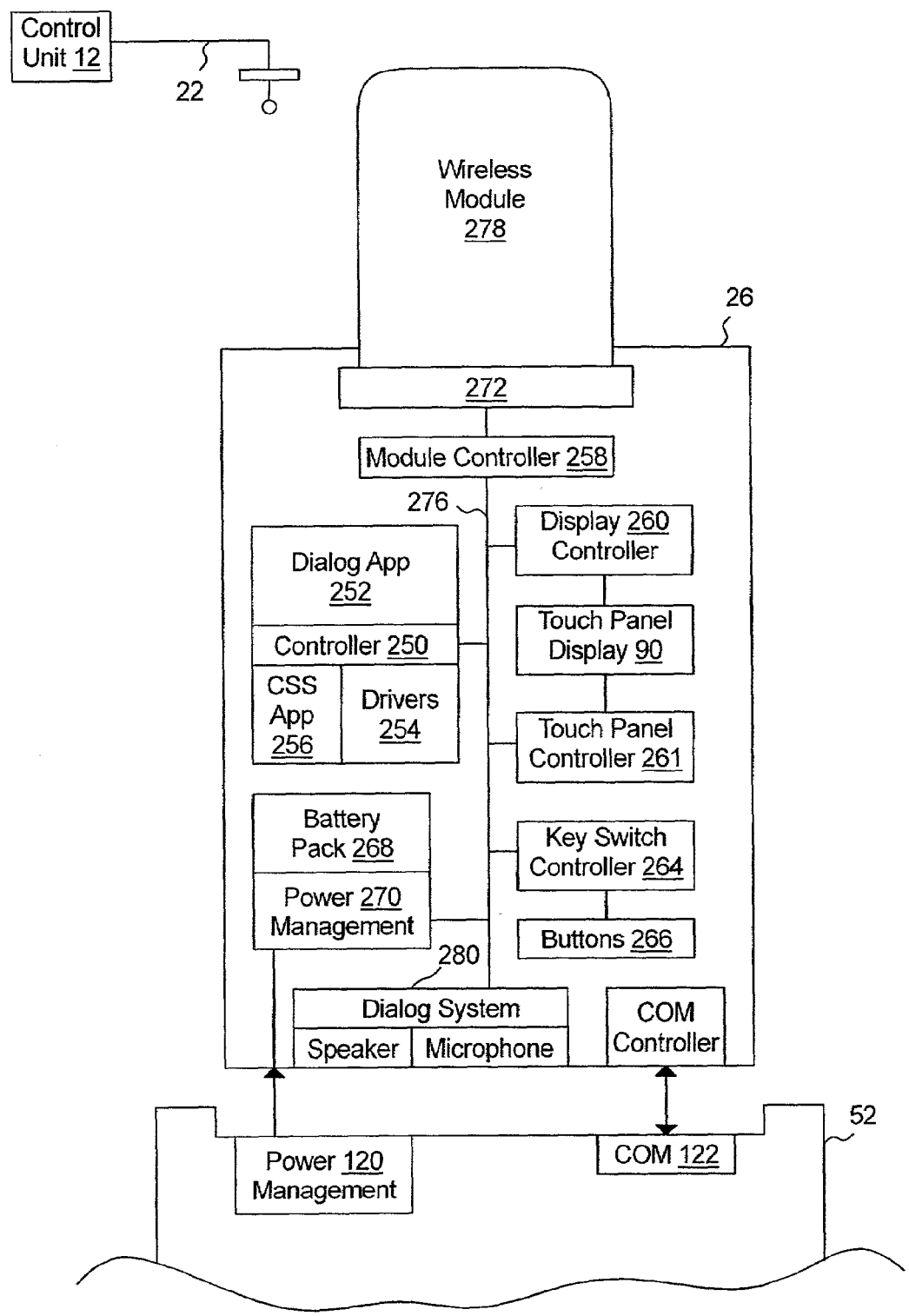
FIG. 7 is a block diagram of a wireless dialog handset in accordance with one embodiment of the present invention.

FIG. 7 shows a block diagram of an exemplary wireless dialog handset 26. The wireless voice handset 26 includes a network circuit 278 and a controller 250 that operates a Communication Space Station application 174", the subscriber contact directory application 178, a LAN communication application 252, and applicable drivers 254 for each of a plurality of peripheral controllers. The controller 250 is interconnected by a bus 276 to the plurality of peripheral controllers which include a module controller 258, a display driver 260, a touch panel driver 261, a key switch controller 264, and a power management circuit 270.

The module controller 258 operatively couples the network circuit 278 to the controller 250 such that the wireless voice handset 26 may communicate with the control unit 12 over the wireless LAN 22 (both of FIG. 1). In the exemplary embodiment, the module controller 258 may be a PCMCIA controller circuit and the network circuit 278 is configured as a PCMCIA card that couples to the module controller 258 through a PCMCIA connector 272. The LAN communication application 252 operates the network circuit 278 for communicating with the control unit 12 using appropriate wireless signaling protocols.

The key switch controller 264 is coupled to the control buttons 266. The key switch controller 264 drives row and column signals to the control buttons 266 and, upon detecting a short between a row and a column indicating button activation, reports the activation to the controller 250. The control buttons may be used by a subscriber for operating the wireless voice handset 26 when uncoupled form the platform unit 52.

The display controller 260 drives the display 90 (optionally a touch panel display 90) using signals compatible with the resolution and color depth of the display 90. The touch panel controller 261 detects user activation of the touch panel display 90. The power management controller 270 operates in conjunction with a battery pack 268, both of which may operate in a similar manner to the power management controller 170, and the battery pack 172 discussed with reference to FIG. 5.

When the wireless voice handset 26 is coupled to the platform unit 52, the Communication Space Station application 174" provides for displaying multi-media communication management information under control the platform unit 52. Additionally, the Communication Space Station application 174" may receive multi-media communication management information content messages and control messages directly from the control unit 12 via the wireless network 22. After receipt of the tagged messages from either the platform unit 52 or the control unit 12, the Communication Space Station application 174" builds a document to display the communication management information represented by the tagged content messages in accordance with display layout control messages that are compatible with the size, resolution, and color depth of the touch panel display 90. The display document is then displayed on the touch panel display 90.

Web Server Application

Referring to FIGS. 9a through 9j in conjunction with FIG. 2, exemplary processing steps performed by the web server application 230 to provide communication services to a communication space station 24 are shown.

Figure 9B:
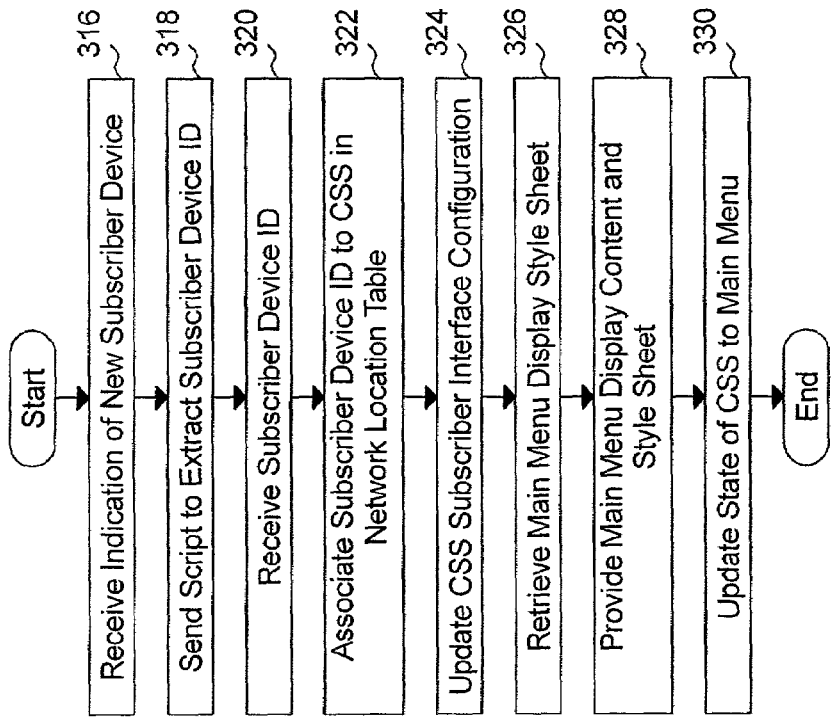
FIGS. 9a through 9j each show a flow chart representing processing steps performed by a multi-media communication management system in accordance with one embodiment of the present invention.
Figure 9A:
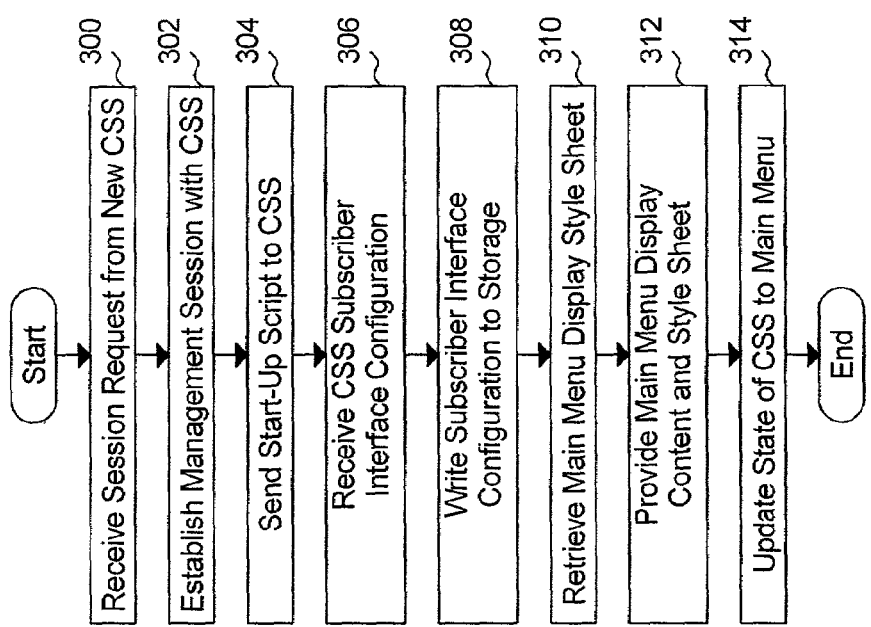

The flowchart of FIG. 9a represents steps performed by the web server application 230 upon receiving an open session request on a predetermined port from a communication space station 24 that has just been operatively coupled to the network 22, obtained a network address from the network address server 220, and is ready to operate as a client to the web server application 230. Step 300 represents receipt of the open session request and step 302 represents establishing a TCP/IP session with the communication space station 24.

Step 304 represents sending a start up script to the communication space station 24. The start up script includes instructions that, when executed by the client application 115, provide for the communication space station 24 to detect its subscriber interface configuration (e.g. whether the communication space station 24 includes a display screen and what capabilities such as video capabilities and graphic resolution capabilities the display screen may have) and to report its subscriber interface configuration back to the web server application 230.

Step 306 represents receipt of the subscriber interface configuration of the communication space station 24 from the communication space station 24 and step 308 represents writing an indication of the subscriber interface configuration of the communication space station 24 to a subscriber interface table 239 in the storage 235.

Step 310 represents retrieving a main menu display style sheet from a selection of style sheets 241 stored in the storage 235. The retrieved main menu display style sheet will be a style sheet that corresponds to the subscriber interface configuration of the communication space station 24.

Step 312 represents providing main menu display content and the style sheet to the communication space station 24 and step 314 represents updating a communication space station state table 243 in the storage 235 to indicate that the communication space station 24 is in a main menu state.

Figure 10B:
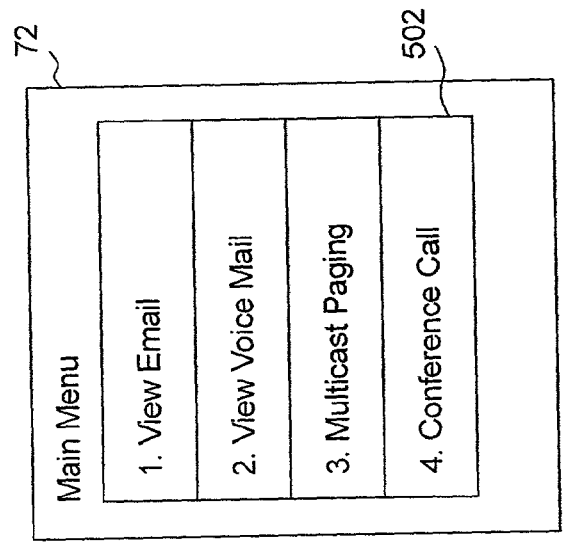
FIGS. 10a through 10f each show an exemplary display of information to a subscriber utilizing a subscriber interface of a communication space station in accordance with one embodiment of the present invention.
Figure 10A:
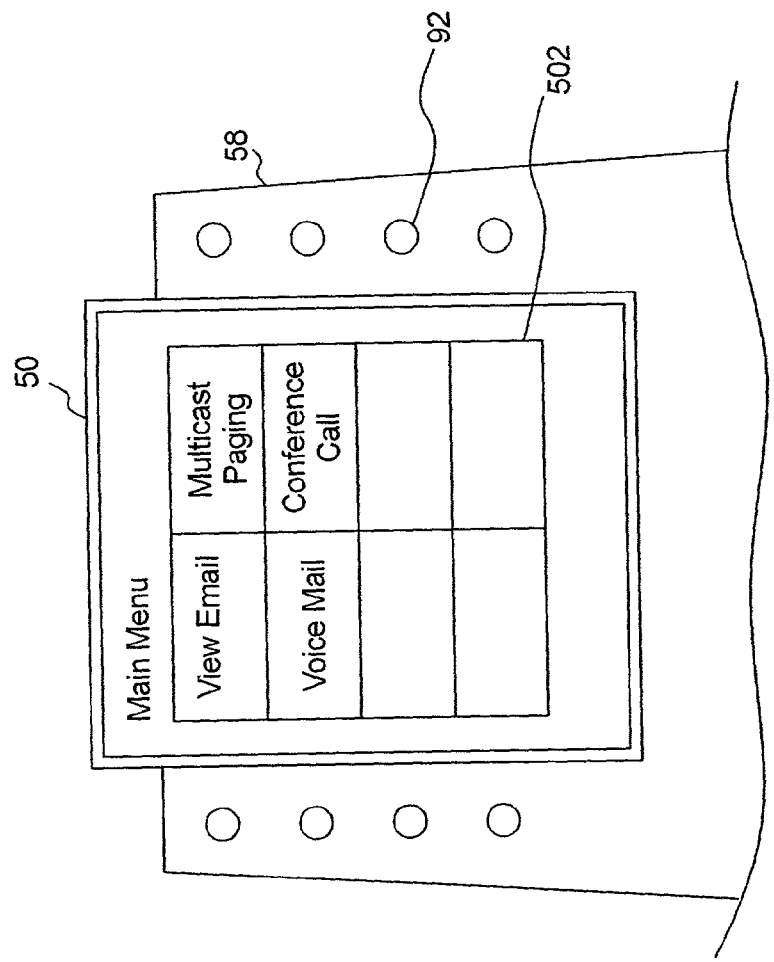

It should be appreciated that the main menu content provided to the communication space station 24 is independent of the subscriber interface, however, the style sheet provided to the communication space station 24 is dependent on the subscriber interface. For example, turning to FIG. 10a which represents display of a main menu on a subscriber device 50 in the modular docking interface 58 the content of the main menu display includes a title of main menu and choices of view email, voice mail, and multi cast paging. The style sheet corresponding to a subscriber interface that includes a subscriber device 50 provides for the content to be graphically displayed with the title at the top and each menu choice to be displayed adjacent a button 92 on the modular docking interface 58. Alternatively, turning to FIG. 10b which represents display of a main menu on a display 72 that is coupled to a communication space station interface 64 (FIG. 3), the content of the main menu display again includes a title of main menu and the choices of view email, voice mail, and multi cast paging. However, the style sheet that corresponds to a subscriber interface that includes a display 72 that is coupled to a communication space station interface 64 provides for the content to be graphically displayed with the title at the top and each choice to be displayed in a vertical list with an adjacent numeral for selection using the keypad 68 (FIG. 3). The examples shown in FIGS. 10a and 10b are for illustrative purposes only. Other subscriber interface configurations that include non-graphic displays, bit mapped multi line text displays, or 7 element single or multi line text displays may utilize different style sheets for displaying all or a portion of the main menu content.

The flowchart of FIG. 9b represents steps performed by the web server application 230 upon receiving an indication that a subscriber device 50 has been coupled to a communication space station 24. Step 316 represents receipt of such indication.

Step 318 represents sending a device ID extraction script to the communication space station 24. The device ID extraction script includes instructions that, when executed by the client application 115, provide for the communication space station 24 to interrogate the subscriber device 50 to determine its device identification (e.g. an identification of which subscriber to which the device has been assigned) and to report the device identification back to the web server application 230.

Step 320 represents receipt of the device identification back from the communication space station 24 and step 322 represents associating the device ID with the communication space station 24 in the network location table 245 in the storage 235. As discussed previously, the packet audio/video gateway 232 utilizes the network location table 245 for routing incoming telephone calls to the particular communication space station 24 at which a subscriber's subscriber device 50 is then currently coupled. It should be appreciated that this step 322 provides for the network location table 245 to properly indicate association between a communication space station 24 and the subscriber device 50 that is served thereby.

Because the style sheet selected for display of content on the communication space station 24 is dependent on the subscriber interface configuration of the communication space station 24 as determined by the subscriber interface table 239, the table should be updated when the subscriber interface configuration changes. Coupling a subscriber device 50 to a communication space station 24 changes the subscriber interface because the display of the subscriber device 50 becomes a display for the communication space station 24. As such, step 324 represents updating the subscriber interface configuration of the communication space station 24 in the subscriber interface table 239.

Step 326 represents retrieving a main menu display style sheet that is applicable to the new subscriber interface configuration from the selection of style sheets 241 in the storage 235 and step 328 represents providing main menu display contend and the style sheet to the communication space station 24. Step 330 represents updating the communication space station state table 243 to assure that it represents that the communication space station 24 is in the main menu state.

Figure 9D:
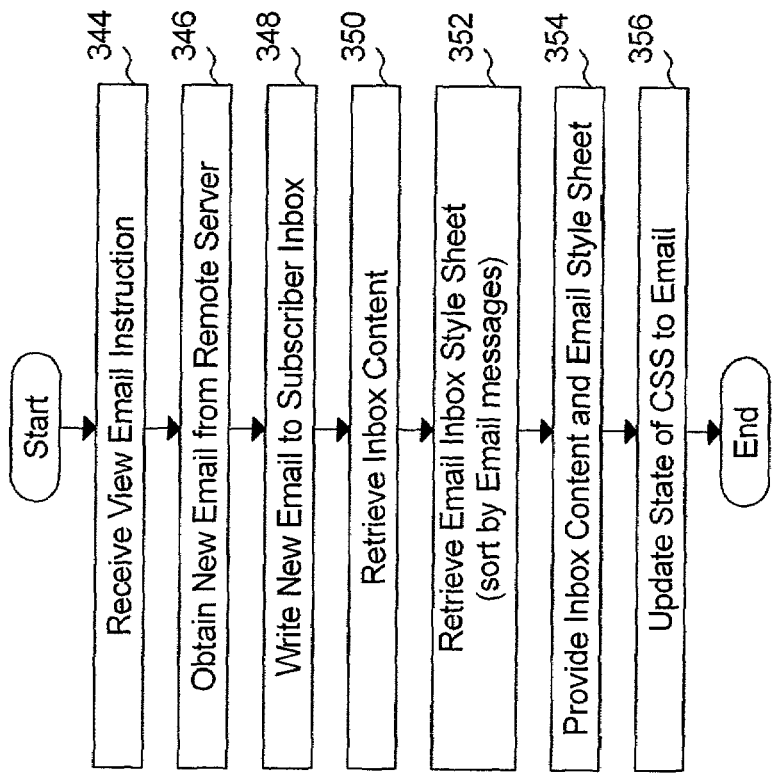
Figure 9C:
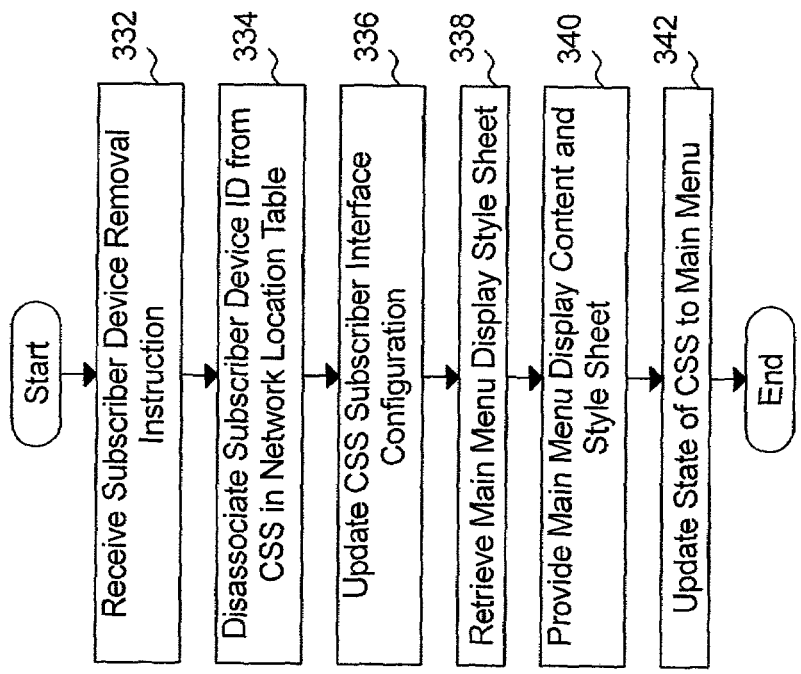

The flow chart of FIG. 9c represents steps performed by the web server application 230 upon receiving an indication that a subscriber device 50 has been removed from a communication space station 24. Step 322 represents receipt of such an indication.

Because the packet audio/video gateway 232 utilizes the network location table 245 for routing incoming telephone calls to the particular communication space station 24 at which a subscriber's subscriber device 50 is then currently coupled, the network location table should be updated upon removal of a subscriber device form a communication space station 24. Step 334 represents disassociating the subscriber device 50 from the communication space station 24 in the network location table 245.

Because the display on the subscriber device 50 is no longer part of the subscriber interface of the communication space station 24 after the subscriber device 50 is removed, step 336 represents updating the subscriber interface configuration table 239.

Step 338 represents retrieving a main menu display style sheet that is applicable to the subscriber interface configuration without the subscriber device 50 from the selection of style sheets 241 in the storage 235 and step 340 represents providing main menu display content and the style sheet to the communication space station 24. Step 342 represents updating the communication space station state table 243 to assure that it represents that the communication space station 24 is in the main menu state.

The flowchart of FIG. 9d represents steps performed by the web server application 230 upon receiving a subscriber indication, of a command to view subscriber email messages, and information for accessing the subscriber's email account. The means by which the communication space station 24 may detect such a subscriber indication is dependent on the subscriber interface configuration of the communication space station 24. For example, if the subscriber interface includes the email button 78 (FIG. 3), detection of button 78 activation would be a subscriber indication of a command to view subscriber email messages. Similarly, subscriber activation of the email menu choice on the main menu either by touch panel activation or by activation of a button associated with the menu choice (either or both of which may be applicable dependent on the subscriber interface configuration) would be a subscriber indication of a command to view subscriber email messages. Further, the view email command can be docking a subscriber device 50, e.g., the subscriber data assistant 86 or the device 88, into the appropriate docking interface 58. Step 344 represents the web server application 230 receiving the subscriber indication of a command to view subscriber email messages and log-in information (e.g., subscriber device ID, user name, and/or password) for logging into the subscriber's email account.

Step 346 represents instructing the email module 228 to logon to an email server (which may be a remote email server coupled to the network 18) and to receive new email messages associated with the subscriber's account. The email module 228 uses the log-in information to access and retrieve emails from the subscriber's account. Step 348 represents writing the new email messages to the subscriber inbox in the email files 247 in the storage 235. In an embodiment wherein the remote email server maintains subscriber inbox information, steps 346 and 348 may be viewed as synchronizing the email messages between the remote server and the email files 247. It should also be appreciated that the email module 228 may periodically retrieve new email messages and write to the subscriber inbox independently of whether the subscriber has activated an email control. As such, the inbox will already include new messages and steps 346 and 348 may not need to be performed in response to event 344.

Step 350 represents retrieving inbox content from the email files 247 and step 352 represents retrieving an inbox style sheet that is applicable to the subscriber interface from the style sheets 241 in the storage 235. Because the subscriber's voice mails will be sent to the subscriber's email account as audio files, it is possible that the email messages retrieved at step 346 will include both text based emails and emails from the voice mail server 236. Because the subscriber activated a command to view email messages, the inbox style sheet provides for the display of the email messages received from senders other than the voice mail server 236 to be displayed first (or on the top of the display).

Step 354 represents providing the inbox content and style sheet to the communication space station 24 and step 356 represents updating the communication space station state table 243 to indicate that the communication space station 24 is in an email state.

Figure 9F:
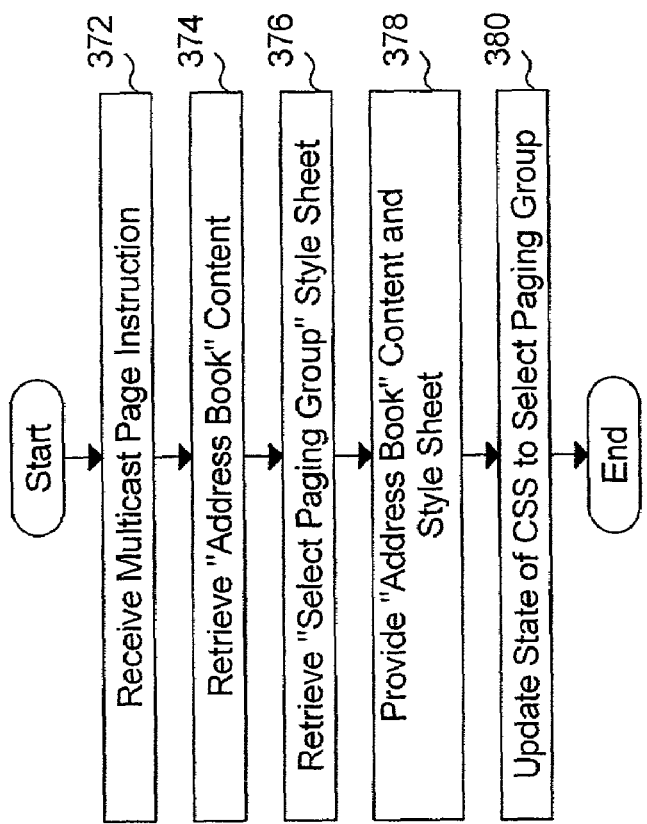
Figure 9E:
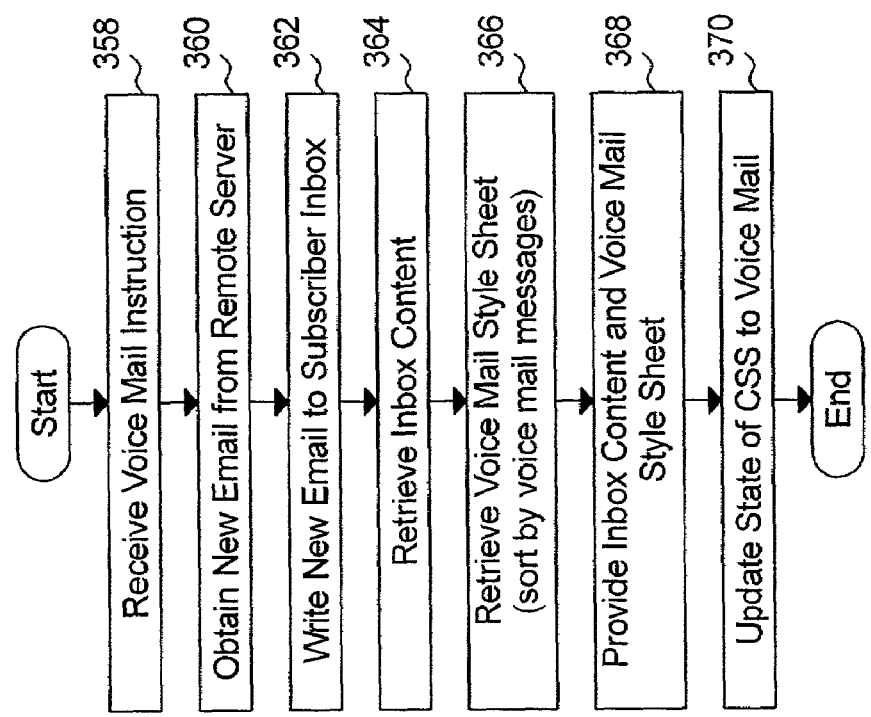

The flowchart of FIG. 9e represents steps performed by the web server application 230 receiving a subscriber indication of a command to obtain voice mail messages. Again, the means by which the communication space station 24 may detect such a subscriber indication is dependent on the subscriber interface configuration of the communication space station 24. For example, if the subscriber interface includes the voice mail button 76 (FIG. 3), detection of button 76 activation would be a subscriber indication of a command to obtain voice mail messages. Similarly, subscriber activation of the voice mail menu choice either by touch panel activation or by activation of a button associated with the menu choice would be a subscriber indication of a command to obtain voice mail messages. Step 358 represents the web server application 230 receiving the subscriber indication of a command to obtain voice mail messages.

Because voice mail messages will be sent as audio files from the voice mail server 236 to the subscriber's email account, step 360 represents instructing the email module 228 to logon to the email server and to receive new email messages associated with the subscribers account. Step 362 represents writing the new email messages to the subscriber inbox in the email files 247 in the storage 235.

Step 364 represents retrieving inbox content from the email files 247 and step 366 represents retrieving an voice mail style sheet that is applicable to the subscriber interface from the style sheets 241 in the storage 235. Because the email messages that include voice mail audio files from the voice mail server 236 may be intermixed with email messages from other senders, the voice mail style sheet provides for only the display of the voice mail messages received from the voice mail server 236.

Step 368 represents providing the inbox content and the voice mail style sheet to the communication space station 24 and step 370 represents updating the communication space station state table 243 to indicate that the communication space station 24 is in a voice mail state.

The flowchart of FIG. 9f represents steps performed by the web server application 230 upon receiving a subscriber indication of a command to initiate a multicast paging message. The communication space station 24 may detect such a subscriber indication by various means, such as touch panel activation of button activation of a menu selection on the main menu, dependent on the subscriber interface configuration of the communication space station 24. Step 372 represents the web server application 230 receiving the subscriber indication of a command to initiate a multicast paging message.

Step 374 represents retrieving the subscriber's address book content 249 from the email files 247. Turning briefly to FIG. 8b, the address book content 249 may comprise a plurality of records with each record including a group identification name and identification of each subscriber in such group, and, if the group identifies a single person, contact information for the person.

Step 376 represents retrieving a select paging group style sheet that corresponds to the subscriber interface of the communication space station 24 and step 378 represents providing both the address book content and the select paging group style sheet to the communication space station 24. Step 380 represents updating the communication space station state table 243 to indicate that the communication space station 24 is in the select paging group state.

FIG. 10c represents an exemplary display of the select paging group content utilizing a style sheet that may be applicable for use on a display 72 wherein the subscriber may use buttons or touch panel activation may be utilized to select one or more paging groups to include in the multicast page. It should be appreciated that some paging groups may include only a single name such that individuals may be selected to include in the multicast page. Because the list of groups included in the paging group content may be larger than can be displayed on the display 72, the style sheet may provide for only a portion of the content to be displayed along with touch activated scroll controls for display of the remainder of the content. The style sheet may further include touch activated controls to return to the main menu and to start the multicast message.

FIG. 10d represents an exemplary display of the select paging group content utilizing a style sheet that may be applicable for display of the content on a display of a subscriber device 50 coupled in the modular docking interface 58. Because subscriber selection is to be by activation of buttons 92, the style sheet provides for the content to be displayed with the groups on the left side for selection by buttons 92 on the left side of the modular docking interface 58 and for indicators to label the function of the buttons 92 on the right side of the modular docking interface 58 such as scroll up, scroll down, start message, and return to main menu.

Figure 9G:
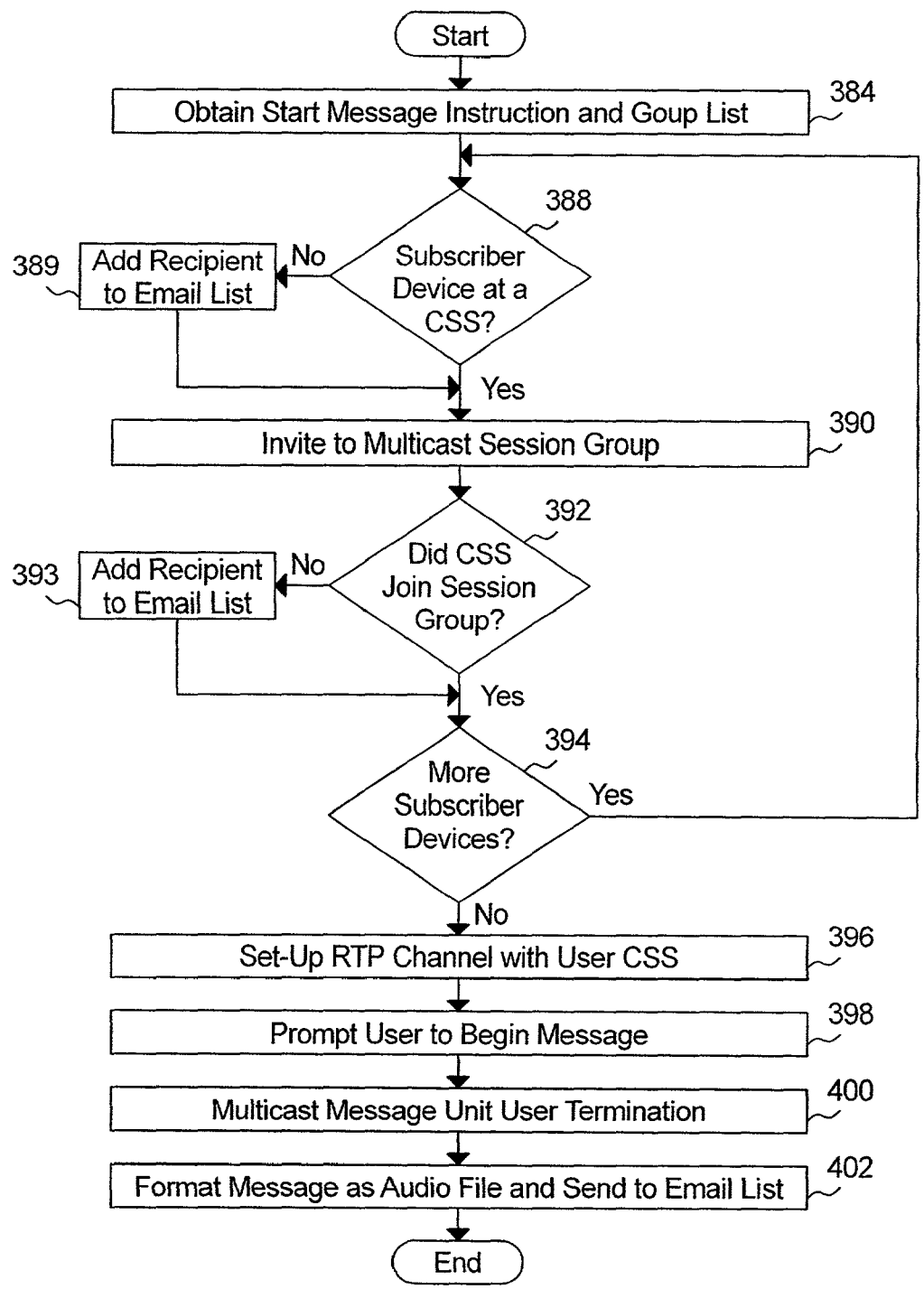

The flowchart of FIG. 9g represents steps performed by the web server application 230 upon receiving a subscriber indication of a command to start the multicast paging message. Step 384 represents receipt of such a subscriber indication along with identification of the subscriber selected multicast groups to include in a multicast recipient list.

Steps 388 through 394 represent steps that are performed by the web server application 230 for each recipient. Such steps may be performed in sequence or in parallel. For purposes of illustration, the steps are shown performed in sequence. Step 388 represents identifying the subscriber device 50 that is associated with the recipient and determining if the subscriber device is then currently coupled to a communication space station 24. If yes, step 390 represents inviting such communication space station 24 to the multicast session group. However, if the subscriber device 50 associated with the recipient is not coupled to a communication space station 24 where the subscriber may receive the multicast, then at step 389 the recipient is added to an email list.

Following step 390, step 392 represents determining whether the communication space station 24 joined the multicast session group. If the communication space station 24 is operating a voice session, it would be inappropriate to interrupt the voice session with a multicast page for the subscriber. As such, it is envisioned that the communication space station 24 may, when in certain operational states, not join the multicast session group. In which case, the recipient is added to the email list at step 393. At this time, the voice mail module 236 is invited to the multicast session group to receive the multicast on behalf of each recipient added to the email list at step 389 or 393.

After the recipient is either added to the email list at step 393 or the communication space station 24 joined the multicast session group at step 392, step 394 represents determining if steps 388 though 392 must be performed for additional recipients. If not, step 396 represents establishing a RTP channel with the communication space station 24 that initiated the multicast paging message and step 398 represents instructing the web server 230 to prompt the subscriber to begin the multicast paging message.

Step 400 represents multicasting the message to the session group utilizing the multicast module 231 and step 402 represents instructing the voice mail module 236 to terminate the multicast, build an audio file, and send the audio file by email to each recipient that was added to the email list at either step 389 or 393.

Figure 9H:
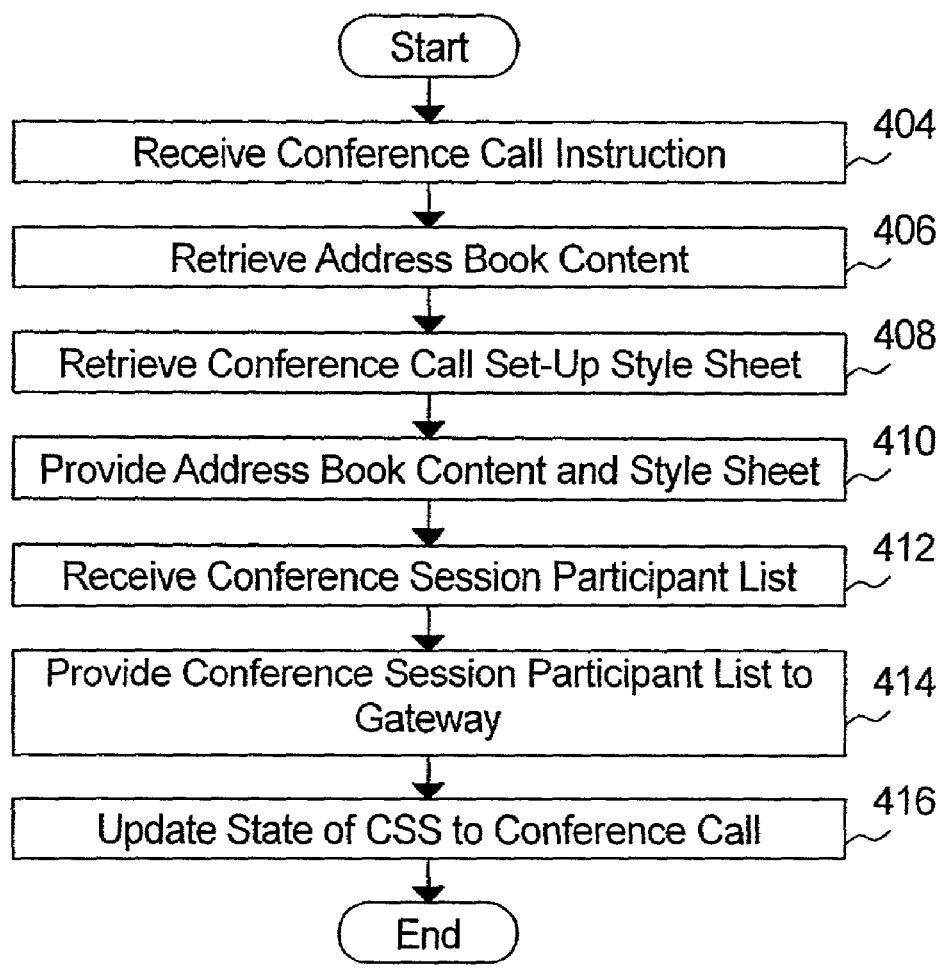

The flowchart of FIG. 9h represents steps performed by the web server 230 upon receiving a subscriber indication of a command to initiate an audio or an audio/video conference call from a communication space station 24. The communication space station 24 may detect such a subscriber indication by various means, such as by subscriber activation of the conference call control 502 on the touch panel 72 of FIG. 10b or by activation of a button 92 corresponding to the conference call menu selection on the display screen 50 of FIG. 10a. Step 404 represents the web server 230 receiving such an indication from a communication space station 24.

Step 406 represents retrieving the subscriber's address book content 249 from the email files 247 and step 408 represents retrieving a "select conference session participants" that corresponds to the subscriber interface of the communication space station 24 from the style sheets 241 in the storage 235. Step 410 represents providing both the address book content and the style sheet to the communication space station 24 for display.

Step 412 represents receiving subscriber selection of participants for the conference call. FIG. 10e represents an exemplary display of the address book for selection of conference call participants on the touch panel 72. The communication space station 24 may detect subscriber activation of the touch panel 72 to "highlight" conference call participants and indicate that selection is complete by activating a finished control 512. Upon activation of the finish control 512, the communication space station 24 will provide the subscriber selection of participants to the web server 230.

Step 414 represents providing the conference session participant list to the packet audio/video gateway 232 and step 416 represents updating the state of the communication space station 24 to a conference call state.

After receiving the session participant list from the web server 230, the packet audio/video gateway 232, or more specifically the call signaling module 227 (FIG. 2) will establish applicable audio and video communication channels with those communication space stations 24 that are serving subscriber devices associated with the participants in accordance with the steps discussed with respect to FIG. 11a. With the communication channels open, the packet voice gateway 232 will activate the conference mix module 237 to begin mixing the audio streams from each communication space station 24 participating in the call. The packet voice gateway will also report the status of each participant to the web server 230. More specifically, the status will include an indication of whether each session participant is connected to the conference or is inactive (not connected to the conference). As will be discussed later, the status may also indicate whether the participant has stopped providing an active audio stream (e.g. put his or her phone on mute) and may indicate whether the conference mixing module 237 has suspended sending a conference mix to the participant (e.g. the packet audio/video gateway 232 has placed a particular participant on hold for a time period to so that others can converse without such participant hearing the conversation).

Figure 9J:
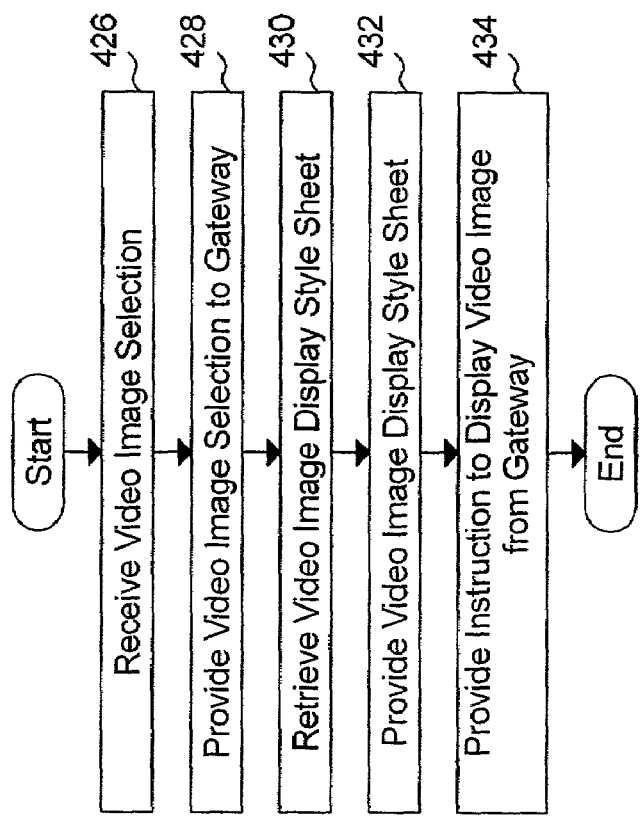
Figure 9I:
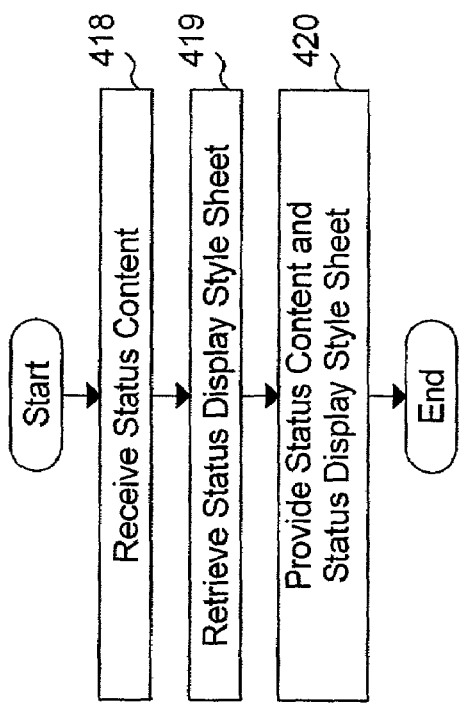

The flowchart of FIG. 9i represents steps performed by the web server application 230 upon receiving conference status content from the packet audio/video gateway 232. Step 418 represents receipt of the status content. Step 419 represents retrieving a "status" style sheet form the style sheets 241 in the storage 235 and step 420 represents providing the status content and the style sheet to at least the initiating communication space station 24 and optionally, to other communication space stations 24 participating in the conference call. It should be appreciated that the steps for the flowchart of FIG. 9i may be repeated several times during the duration of a conference call as the status of each participant changes.

FIG. 10f represents an exemplary display of the status of each participant on the touch panel 72. The display includes a vertical listing of each participant and an indication of the participants status in a column 514. An "A" indicates that the participant is active (e.g. sending a non-mute audio stream and receiving a conference mix audio stream). An "I" indicates that the participant is not on the conference call. A "M" indicates that the participant has muted his or her telephone and is not sending an audio stream. An "H" indicates that the participant has been placed on hold by the initiating communication space station and is not receiving a conference mix.

The display also includes a video indication column 516. This column indicates which participants are not sending a video image signal to the packet voice/video gateway 232 (e.g. the "Φ" symbol). Because the subscriber may select which of the participants to view during a video conference, the video column 516 will also indicate the subscribers selection of the video image to view if the subscriber activates the video control 520. In the exemplary display, the "*" symbol associated with Dave indicates that the subscriber would view the video image provided by Dave's communication space station 24 upon activating the video control 520. The subscriber may change such selection by utilizing the controls of the touch panel 72. Upon detecting activation of the video control, the communicating space station 24 will report the indication to the web server application 230.

The display also includes a hold control 522. The initiating subscriber may indicate his or her desire to place a participant(s) on hold status by highlighting the participant(s) and activating the hold control 522. Upon detecting activation of the hold control 522, the communication space station 24 will report the indication to the web server application 230. Upon receiving the indication, the web server application 230 will provide the indication to the packet voice/video gateway 232 which will place the selected participant(s) on hold status and return updated status content to the web server application 230.

The flow chart of FIG. 9j represents steps performed by the web server 230 upon receiving a subscriber indication of a video image selection from a communication space station 24. Step 426 represents such receipt by the web server 230. Step 428 represents providing the video image selection to the packet voice/video gateway 232. The packet voice/video gateway 232 will then begin relaying the selected video image to the subscriber station. Step 430 represents the web server application 230 retrieving a style sheet for the display of the video image. Step 432 represents providing the style sheet to the communication space station 24 and step 434 represents providing instructions to display the video image received from the packet voice/video gateway 232 in conjunction with the style sheet.

Figure 10H:
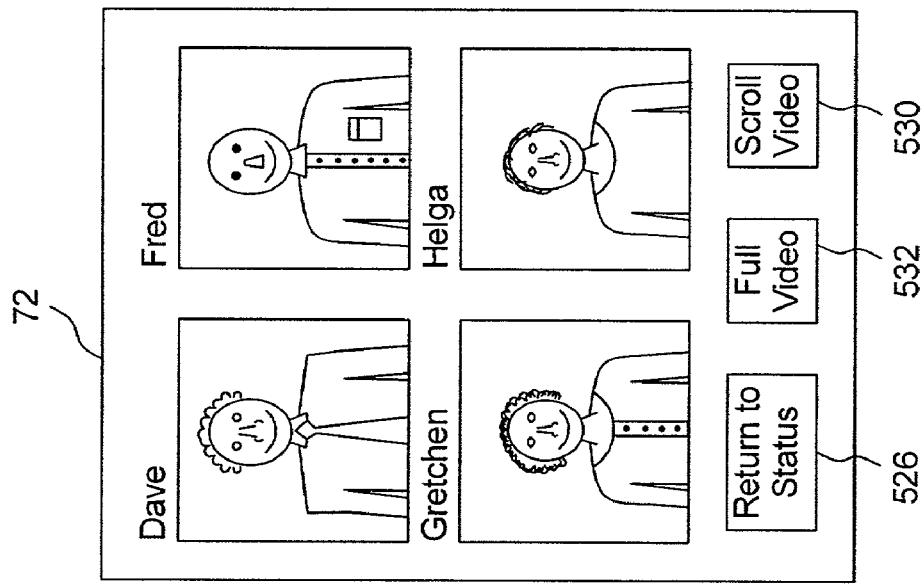
Figure 10G:
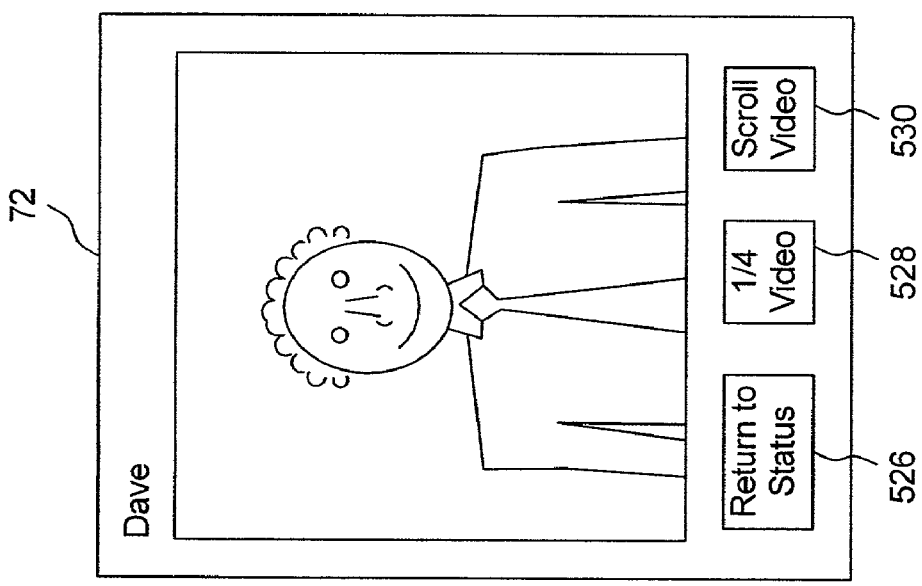

FIG. 10g represents an exemplary display of a single video image on the touch panel 72. The display will include a control to return to the status page which, when activated, will cause the communication space station 24 to return to the display of FIG. 10f.

The display will also include a scroll video control 530 which, when activated will cause the communication space station 24 to report such activation to the web server 230. The web server 230 performs the steps discussed with respect to FIG. 9 with the selected image scrolled by one video image.

The display will also include a ¼ video control 528 which, when activated will cause the communication space station 24 to report such activation to the web server application 230. The web server application 230 will perform the steps discussed with respect to FIG. 9 but the packet voice/video gateway 232 will provide a mixed video image comprising each of four video images arranged in the four corners of the display as represented by FIG. 10h.

From any of the displays associated with the conference call (e.g. FIG. 10e, FIG. 10f, FIG. 10g, and FIG. 10h, termination of the call will cause the communication space station 24 to return to the main menu as represented by FIGS. 10a or 10b.

It should be appreciated that the systems and methods of the present invention provide enhanced conference call services to subscribers of the multimedia communication management system of the present invention. Although the invention has been shown and described with respect to certain preferred embodiments, it is obvious that equivalents and modifications will occur to others skilled in the art upon the reading and understanding of the specification. For example, the communication controllers 122 of the communication space station 24 could send an indication of docking by the devices 86, 88, into the docking interface 58, to the control unit 12, and the control unit 12 could initiate an email download request. Additionally, one or more of the docking interfaces could be integrated into the communication space station 24. It is envisioned that after reading and understanding the present invention those skilled in the art may envision other processing states, events, and processing steps to further the objectives of the modular multi-media communication management system of the present invention. The present invention includes all such equivalents and modifications, and is limited only by the scope of the following claims.

What is claimed is:

1. A desk top telephone station for use with a packet-switched network, the desk top telephone station comprising:
   a network interface configured to couple to the packet-switched network;
   a docking station interface configured to couple to each of a plurality of portable communication devices, each of the plurality of portable communication devices being uniquely associated with one of a plurality of users;
   a voice interface including a microphone configured to receive sound signals and a speaker configured to provide sound signals;
   a user activated electronic message control which, if activated by the user, is indicative of a command to view electronic messages; and
   a communication controller coupled to the voice interface, the docking-station interface, the user activated control, and the network interface, the communication controller executing instructions for:
      initiating communication to the portable communication device to obtain, from the portable communication device, information that is needed to access the user's electronic message inbox;
      generating an electronic message download request in response to detection of the command to view electronic messages, the electronic message download request including the account access information;
      sending the electronic message download request to a remote electronic message system;
      receiving, from the remote electronic message system, electronic messages from the inbox accessible with the account access information; and
      generating, on the portable communication device, a display of a listing of the electronic messages received from the electronic messaging system wherein the communication controller further:
      receives, from the portable communication device, an indication of user selection of a one of the electronic messages represented in the display of a listing of electronic messages that includes an attached audio file; and
      in response to receipt of such indication, drives the voice interface to output an audio representation of the audio file through the speaker.

2. The desk top telephone station of claim 1, wherein the access information includes at least one of a login name and a password.

3. The desk top telephone station of claim 1, wherein the access information includes a device ID of the portable communication device.

4. A method of operating a desk top telephone station to download and display a listing of electronic messages from an inbox of a remote electronic message system that is associated with a user of a portable communication device, the method comprising:
   initiating communication to the portable communication device, through a docking station interface, to obtain, from the portable communication device, information that is needed to access the user's electronic message inbox;
   generating an electronic message download request in response to detecting that the user has activated an electronic message control on the desk top telephone station;
   sending the electronic message download request to the remote electronic message system;
   receiving, from the remote electronic message system, electronic messages from the inbox accessible with the account access information;
   generating, on the portable communication device, a display of a listing of the electronic messages received from the remote electronic message system;
   receiving, from the portable communication device, an indication of user selection of a one of the electronic messages represented in the display of a listing of electronic messages that includes an attached audio file; and
   in response to receipt of such indication, driving output of an audio representation of such audio file through a speaker of the desk top telephone station.

5. The method of claim 4 wherein the access information includes a device ID of the portable communication device.

6. The method of claim 4 further comprising the control unit communicating with a server to obtain the download data.

7. A telecommunications system comprising:
   a desk top telephone station comprising:
      a network interface configured to couple to the packet-switched network;
      a docking station interface configured to couple to each of a plurality of portable communication devices, each of the plurality of portable communication devices being uniquely associated with one of a plurality of users;
      a voice interface including a microphone configured to receive sound signals and a speaker configured to provide sound signals;
      a user activated control which, if activated by the user, is indicative of a command to view electronic messages; and
      a communication controller coupled to the voice interface, the docking-station interface, the user activated control, and the network interface, the communication controller executing instructions for:
initiating communication to the portable communication device to obtain, from the portable communication device, information that is needed to access the user's electronic message inbox;
generating an electronic message download reguest in response to detection of the command to view electronic messages, the electronic message download reguest including the account access information;
sending the electronic message download reguest to a remote electronic message system;
receiving, from the remote electronic message system, electronic messages from the inbox accessible with the account access information; and
generating, on the portable communication device, a display of a listing of the electronic messages received from the electronic messaging system and a system control unit coupled to the desk top telephone station through a packet-switched network, the system control unit comprising:
a wide area network interface for exchanging electronic messages with remote electronic messaging systems;
an electronic message module comprising:
systems for receiving from the remote electronic messaging systems, and storing the received electronic messages addressed to an identified user in a one of a plurality of electronic message inboxes that is associated with the identified user; and
the electronic message system for receiving the message download reguest and returning the electronic messages stored in the user inbox file associated with the account access information recives from the portable communication device an indication of user selection of a one of the electronic messages represented inthe display of a listing of electronic messages that includes an attached audio file; and
in response to receipt of such indication, drives the voice interface to output of an audio representation of the audio file through the speaker.

8. The system of claim 7, wherein the access information includes at least one of a login name and a password.

9. The system of claim 7, wherein the access information includes a device ID of the portable communication device.

* * * * *